United States Patent [19]
Sakai

[11] Patent Number: 5,043,052
[45] Date of Patent: Aug. 27, 1991

[54] FLEXIBLE RAIL, FLEXIBLE CONVEYOR AND ELECTRODEPOSITION COATING SYSTEM WITH FLEXIBLE CONVEYOR

[75] Inventor: Hideyuki Sakai, Okazaki, Japan

[73] Assignees: Nichidai Industrial Co. Ltd., Aichi; Daiwa Paint Trading Co., Ltd., Nagoya, both of Japan

[21] Appl. No.: 436,054

[22] Filed: Nov. 13, 1989

[30] Foreign Application Priority Data

Jul. 18, 1989 [JP] Japan .................. 1-185660

[51] Int. Cl.$^5$ .............................. B65G 49/04
[52] U.S. Cl. ..................... 204/299 R; 204/299 EC; 204/300 EC; 204/180.2; 104/94; 104/111; 104/172.4; 198/631; 198/861.2; 238/10 R
[58] Field of Search ............... 104/94, 111, 172.4; 198/346.3, 631, 861.2; 238/10 A, 10 B, 10 F; 204/180.2, 299 EC, 299 R, 300 EC

[56] References Cited

U.S. PATENT DOCUMENTS

| | | | |
|---|---|---|---|
| 2,512,610 | 6/1950 | Cartlidge | 198/861.2 |
| 2,609,083 | 9/1952 | Leach | 198/346.3 |
| 2,722,306 | 11/1955 | Cartlidge et al. | 198/861.2 |
| 2,743,809 | 5/1956 | Pearson | 198/861.2 |
| 2,795,315 | 6/1957 | Hahir et al. | 198/861.2 |
| 2,931,315 | 4/1960 | Daigle | 104/111 |
| 3,142,373 | 7/1964 | Pollard | 198/861.2 |
| 3,684,080 | 8/1972 | Van Nest | 198/861.2 |
| 3,800,707 | 4/1974 | Hermann | 104/94 |
| 4,449,665 | 5/1984 | Goldfarb et al. | 238/10 F |
| 4,727,981 | 3/1988 | Johansson | 198/861.2 |

FOREIGN PATENT DOCUMENTS

| | | |
|---|---|---|
| 57135641 | 2/1986 | Japan . |
| 57153328 | 2/1986 | Japan . |
| 60-61384 | 10/1986 | Japan . |
| 60192863 | 3/1987 | Japan . |

Primary Examiner—John F. Niebling
Assistant Examiner—David G. Ryser
Attorney, Agent, or Firm—Fred Philpitt

[57] ABSTRACT

A flexible rail according to one preferred embodiment of the invention comprises (a) hollow rail pieces each having a generally inverted U-shaped vertical cross section, opposed open ends, a pair of laterally opposed bottom portions for supporting rollers of a roller chain, and a bottom space located between the opposed bottom portions from which hangers may be hung from the roller chain, (b) a pair of laterally opposed side plates fixed to the respective side walls of each rail piece such that the side plates overlap the side walls, (c) a pair of laterally opposed connecting plates each associated with adjacent side plates on one of opposed sides, each of the connecting plates overlapping both of the adjacent side plates, but being fixed to only a rear one thereof, and (d) a pair of pivotal means provided in conjunction with the opposed side plates, respectively, and each connecting a front one of adjacent side plates on one of the opposed sides and a connecting plate on the same side for pivotal movements about a common axis. The flexible rail may be used to provide a flexible conveyor. Also, the flexible rail may be used to provide a flexible trolley conveyor for an electrodeposition coating system.

31 Claims, 12 Drawing Sheets

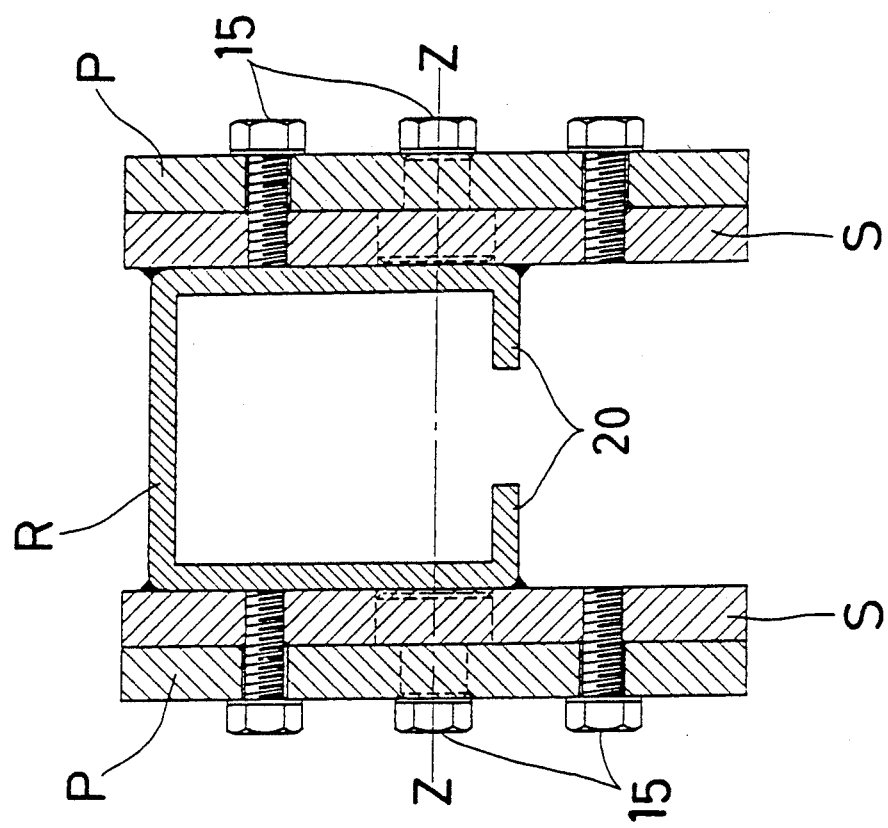
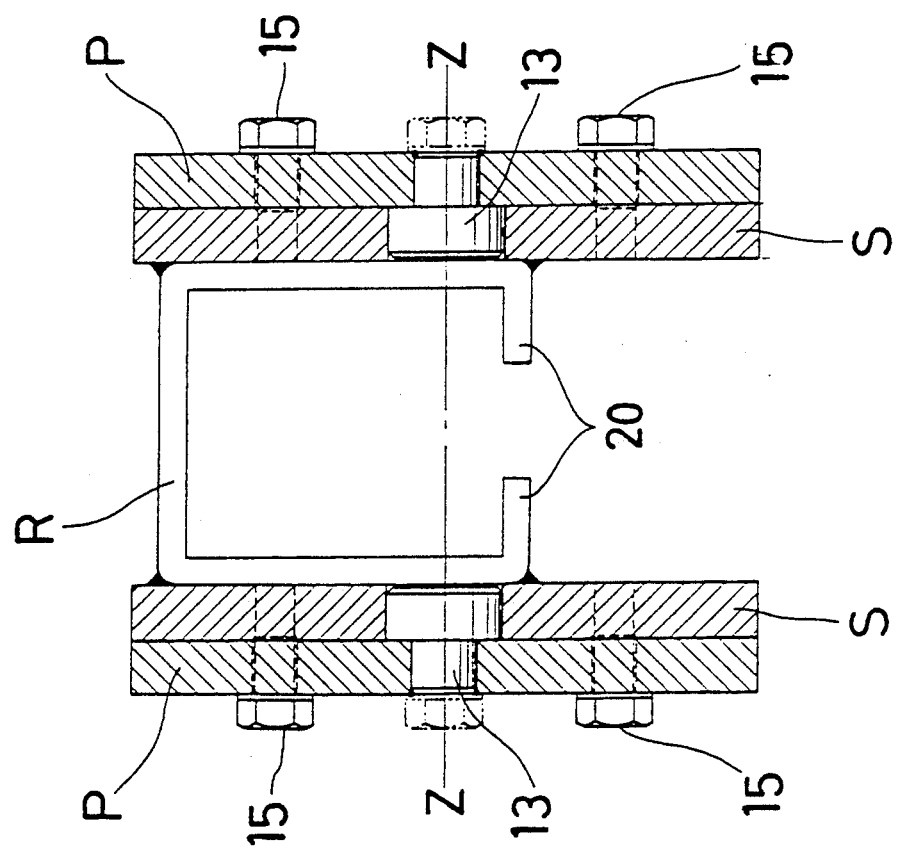

FLEXIBLE RAIL, FLEXIBLE CONVEYOR AND ELECTRODEPOSITION COATING SYSTEM WITH FLEXIBLE CONVEYOR

FIELD OF THE INVENTION

This invention relates to flexible rails, flexible conveyors and electrodeposition coating systems with flexible conveyors.

BACKGROUND OF THE INVENTION

The inventor proposed in Japanese Patent Application No. 60-192863 (published under No. 62-54097 on Mar. 9, 1987) an electrodeposition coating system which includes a trolley conveyor and tanks supported on vvertically extensible lifts. The trolley conveyor comprises first to fifth rails connected to one another. The first rail is straight. The second rail is curved from a lower left to an upper right. The third, or central rail is straight. The fourth rail is curved from an upper left to a lower right. The fifth rail is straight. The central rail is located in a higher position than the other rails. Each rail is a single continuous rigid rail with an inner space extending along the rail, with a generally inverted U-shaped vertical cross section, with opposed open ends, with a pair of laterally opposed bottom portions, and with a bottom space located between the opposed bottom portions. The rails provide a single continuous inner, or path, together. A roller chain is passed through the continuous inner path, and is supported on the bottom portions of the rails at its rollers. Hangers are suspended from the roller chain through the opposed bottom spaces. Works to be electrodeposition coated are hung from the hangers. All the rails are fixed rails. Thus, the trolley conveyor is a fixed one. The roller chain is moved intermittently. The tanks are located directly below the central rail. When the roller chain is stopped, the lifts are extended to move the tanks upward. Thus, the tanks accommodate the works hung from the hangers, so that the works are immersed in liquids filled into the tanks for a required period of time. Then the lifts are retracted. Then, the roller chain is restarted. When each work has come to a position directly above the next tank, the roller chain is stopped again. Then, the lifts are extended again so that each work is accommodated in the next tank. Thus, with such a prior art, the tanks are raised after each intermittent movement of the roller chain.

However, the act of raising heavy objects, i.e., the tanks containing necessary liquids for the electrodeposition coating of works, is not of advantage to an efficient coating operation. If it is possible to move the central rail vertically, the coating operation may be made more efficiently since it is not necessary to move the tanks vertically. Since the works hung from the hangers are relatively small and lightweight objects, the central rail may be moved vertically with a smaller energy than the tanks. Thus, a technique for moving the central rail vertically has been desired. The inventor has developed such a technique. The technique resides in using a "flexible" rail.

SUMMARY OF THE INVENTION

Accordingly, it is an object of the invention to provide a flexible rail which may be used to provide a flexible trolley conveyor.

Another object of the invention is to provide a flexible conveyor with a flexible rail.

Still another object of the invention is provide an electrodeposition coating system with a flexible trolley conveyor.

According to one aspect of the invention, a flexible rail is provided which comprises (A) a plurality of hollow rail pieces each having (i) a top, (ii) opposed side walls, (iii) opposed open ends, (iv) a pair of laterally opposed bottom portions on which a roller chain may be supported, (v) a bottom space between the opposed bottom portions, and (vi) a generally inverted U-shaped vertical cross section, a hanger being capable of being suspended from a roller chain supported on the opposed bottom portions through said space, (B) a pair of laterally opposed side plates fixed to the respective side walls of each of the rail pieces such that the opposed side plates overlap the opposed side walls thereof, (C) a pair of laterally opposed connecting plates each associated with adjacent side plates on one of opposed sides, each of the connecting plates overlapping both of adjacent side plates, but being fixed to only a rear one thereof, and (D) a pair of pivotal means provided in conjunction with the opposed side plates, respectively, and each connecting a front one of adjacent side plates on one of the opposed sides and a connecting plate on the same side for pivotal movements about a common axis. At least one of the rail piece, the side plate and the connecting plate may include longitudinally opposed ridges and upper and lower portions which are tapered from the ridges in an upward direction and in a downward direction, respectively. According to one preferred embodiment of the invention, each side wall of each rail piece, each side plate and each connecting plate include longitudinally opposed ridges and upper and lower portions which are tapered from the ridges in an upward direction and in a downward direction, respectively. All the ridges are located on the same level. The common axis about which a front one of adjacent side plates on one of the opposed sides and a connecting plate on the same side are capable of making pivotal movements is in alignment with a line connecting a ridge formed where a rear inclined end face of the upper tapered portion of one of the side walls of the rail piece meets a rear inclined end face of the lower tapered portion thereof and a ridge formed where a rear inclined end face of the upper tapered portion of the other side wall of the rail piece meets a rear inclined end face of the lower tapered portion thereof. The opposed ridges of each side wall of each rail piece are located within a lower half of the height of the rail piece. Preferably the opposed ridges of each side wall of each rail piece should be located at a level selected from a range of substantially a quarter of the height of the rail piece to substantially one third thereof. If desired, the connecting plate may be formed integrally with a rear one of adjacent side plates.

According to another aspect of the invention, a flexible rail is provided which comprises plural hollow rail pieces, but does not include any side plate nor any connecting plate.

Also, according to the invention, a flexible conveyor is provided which comprises (i) nonflexible rails which each comprise a single continuous rail with an inner space extending along a length of the rail, with opposed open ends, with a pair of laterally opposed bottom portions extending continuously along the length of the rail, and with a bottom space located between the bottom portions, (ii) a flexible rail located between the nonflexible rails and having (a) an inner space extending along a length of the flexible rail, (b) opposed open ends connected to the nonflexible rails, (c) a pair of laterally opposed bottom portions extending substantially continuously along the length of the flexible rail, and (d) a bottom space located between the bottom portions of the flexible rail, (iii) a roller chain extending through the inner spaces of the nonflexible rails and of the flexible rail and having rollers supported on the opposed bottom portions of the nonflexible rails and of the flexible rail, and (iv) hangers suspended from the roller chain through the bottom spaces of the nonflexible rails and of the flexible rail. Works may be hung from the hangers. One of the nonflexible rails is a fixed rail, while the other nonflexible rail is a vertically movable rail. The flexible rail flexes concomitantly, or makes a concomitant wavy motion, when the other nonflexible rail is moved vertically.

Moreover, according to the invention, an electrodeposition coating system is provided which includes a flexible trolley conveyor with nonflexible rails and flexible rails. All the rails are connected to one another. One of the nonflexible rails is located between first and second nonflexible rails. The other flexible rail is located between the second and third nonflexible rails. The first and third nonflexible rails are fixed rails. Each of the first, second and third nonflexible rails comprises a single continuous rail with an inner space extending along the length of the rail, with opposed open ends, with a pair of laterally opposed bottom portions extending continuously along the length of the rail, and with a bottom space located between the bottom portions. Each flexible rail has opposed open ends, an inner space extending along the length of the rail, a pair of opposed bottom portions extending substantially continuously along the length of the rail, and a bottom space located between the bottom portions. The trolley conveyor further includes a roller chain extending through the inner spaces of all the rails and having rollers supported on the opposed bottom portions of the rails, and hangers suspended from the roller chain through the bottom spaces of the rails. Works to be electrodeposition coated are hung from the hangers. Tanks are located on a floor, and is positioned directly below the second nonflexible rail. Support means is provided for supporting the second nonflexible rail for vertical movement. Also, driving means is provided for moving the support means vertically to move the second nonflexible rail between a position higher than the other nonflexible rails and a position lower than the other nonflexible rails. Also, means for moving the roller chain intermittently is provided. This means is so operated that each of the works hung from the hangers stops moving when the work has come to a position directly above each of the tanks. The driving means is operated to move the support means downwardly to move the works into the tanks when the roller chain has been stopped. The flexible rails flex concomitantly, or make concomitant wavy motions, when the second nonflexible rail is moved vertically.

BRIEF DESCRIPTION OF THE DRAWING

FIG. 4(a) is a cross section of the flexible rail taken on line I—I of FIG. 3;

FIG. 4(b) is a cross section of the flexible rail taken on line II—II of FIG. 3;

In FIG. 6, one flexible rail is fixed to a left-hand fixed object at one end thereof and to a vertically movable central object at the other end thereof and the other flexible rail is fixed to a right-hand fixed object at one end thereof and to the vertically movable central object at the other thereof. If the central object is moved vertically, the flexible rails flex as illustrated;

DETAILED DESCRIPTION OF PREFERRED EMBODIMENTS

First Flexible Rail

A flexible rail $F_1$ which embodies the invention in one preferred form will now be described in detail with reference to FIGS. 1 to 6.

Figure 3:
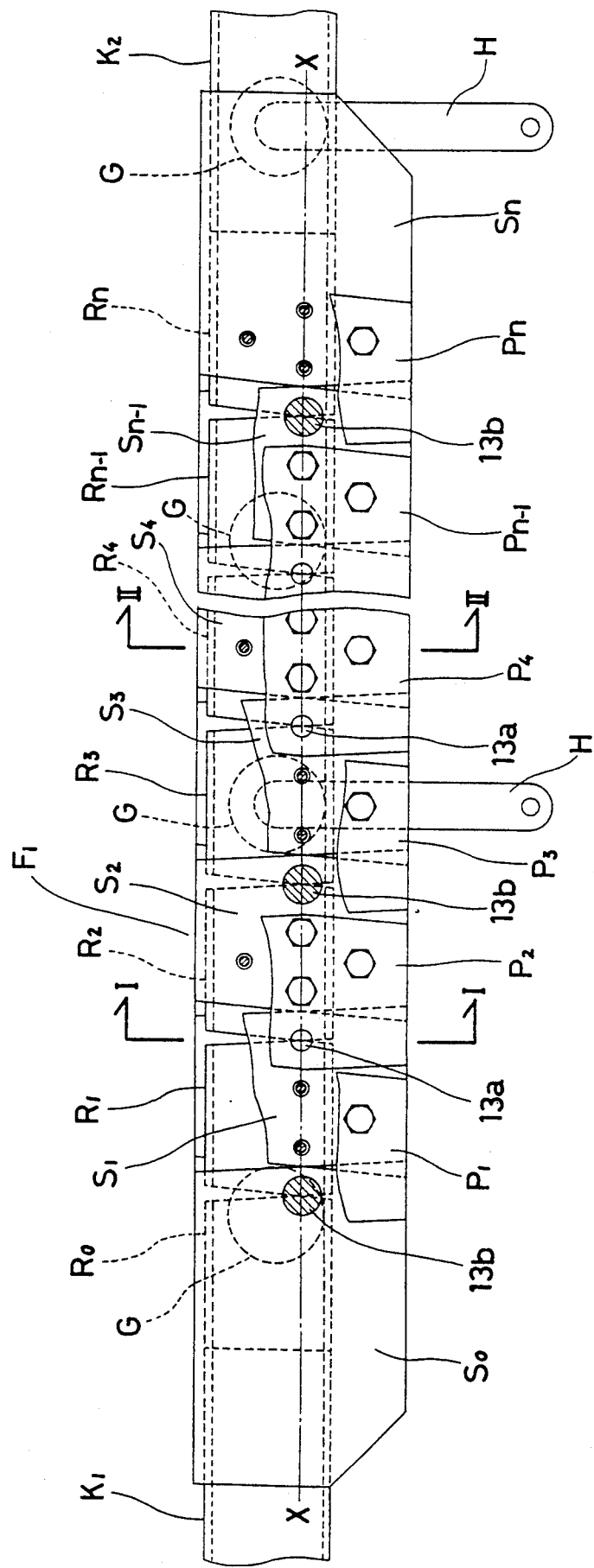
FIG. 3 is a partially cutaway front view of the flexible rail.

The flexible rail F1 comprises plural rail pieces $R_0$ to $R_n$, plural side plates $S_0$ to Sn and plural connecting plates $P_1$ to $P_n$ (FIG. 3).

Figure 1:
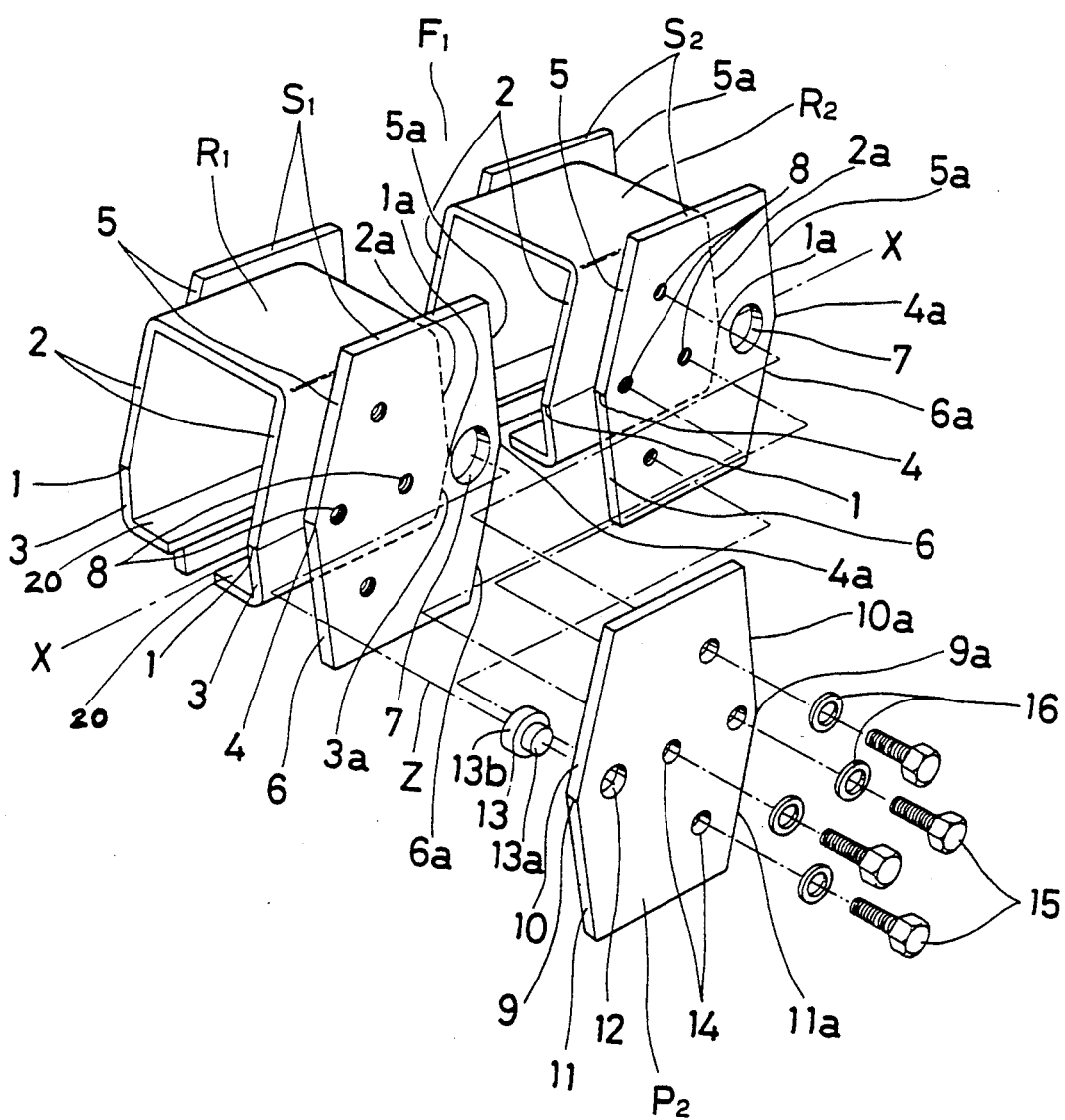
FIG. 1 is a perspective view of major components of a flexible rail which embodies the invention in one preferred form.
Figure 2A:
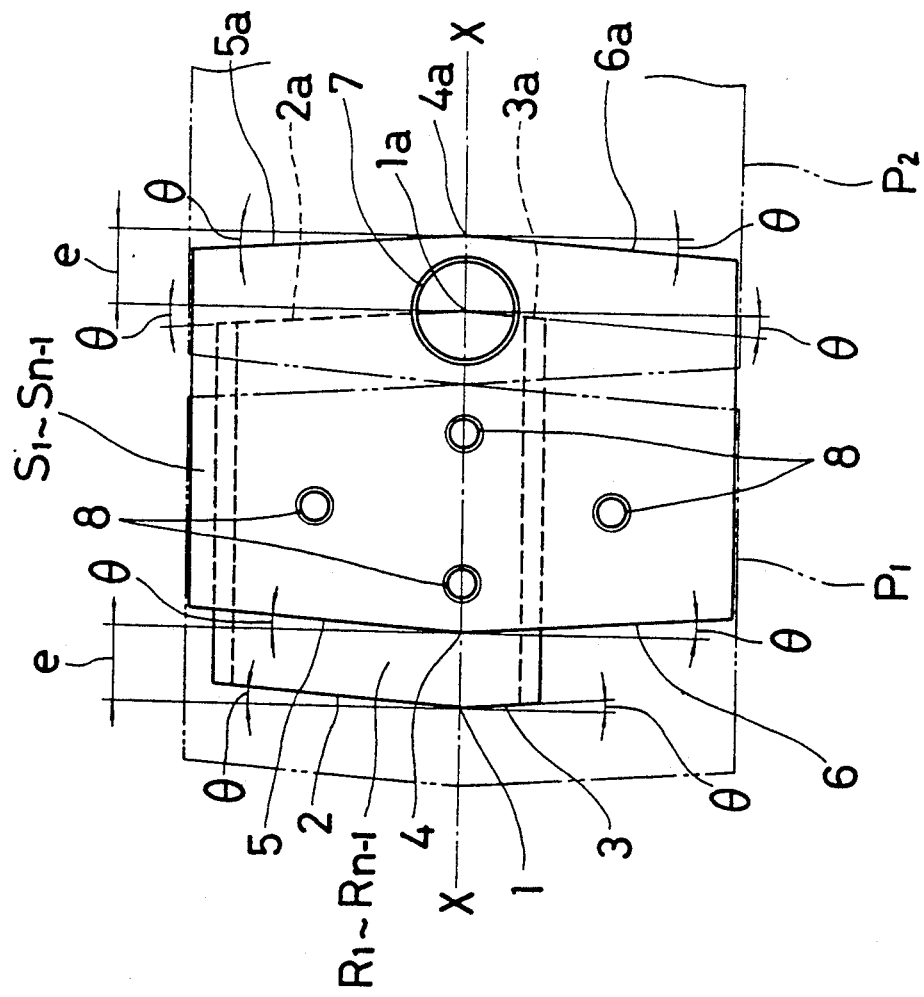
FIG. 2(a) is a front view of a side plate of FIG. 1 welded to a rail piece of FIG. 1.
Figure 2B:
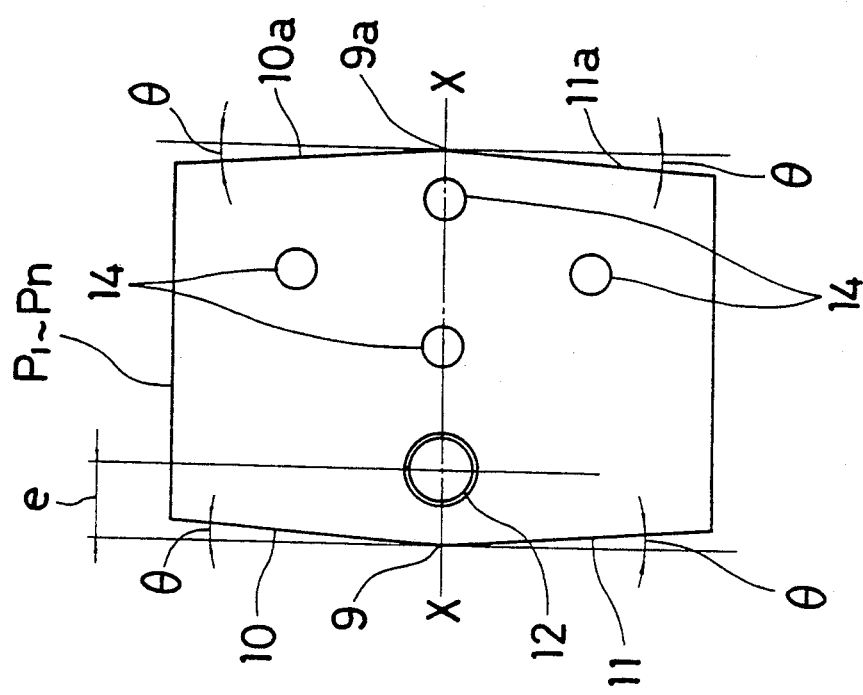
FIG. 2(b) is a front view of a connecting plate of FIG. 1.

All the rail pieces except the leftmost one $R_0$ and the rightmost one $R_n$, namely the intermediate rail pieces $R_1$ to $R_{n-1}$, are identical rail pieces. FIG. 1 depicts two adjacent intermediate rail pieces $R_1$ and $R_2$. FIG. 2(a) depicts one of the intermediate rail pieces.

All the rail pieces are hollow objects.

As shown in FIGS. 1 and 2(a), the intermediate rail piece is generally shaped like a box. The intermediate rail piece has opposed side walls. Each of the side walls is gradually enlarged downwardly from the top of the rail piece toward opposed raised edges, or ridges, 1 and 1a, and is tapered from the ridges toward a lower end. A bottom portion 20 projects inwardly from the lower end of each side wall. Thus the intermediate rail piece has two opposed bottom portions 20. The opposed bottom portions 20 have a space between them.

The intermediate rail piece has opposed open ends.

Each side wall of the intermediate rail piece has upper, opposed inclined end faces 2 and 2a. The inclined end face 2 originates from the ridge 1 and terminates at the top of the side wall. The inclined end face 2a originates from the ridge 1a and terminates at the top of the side wall. Each of the upper inclined end faces 2 and 2a forms an angle of substantially 4 degrees with a vertical plane. This angle is designated by the letter $\theta$ in FIG. 2. Also, each side wall of the intermediate rail piece has lower, opposed inclined end faces 3 and 3a. The inclined end face 3 originates from the ridge 1 and terminates at the lower end of the side wall. The inclined end face 3a originates from the ridge 1a and terminates at the lower end of the side wall. Each of the lower inclined end faces 3 and 3a forms an angle of 4 degrees with a vertical plane. This angle is also designated by the letter $\theta$.

Line X—X represents the height at which the ridges 1 and 1a are located. This height X—X should preferably be selected from a range of substantially a quarter of the overall height of the rail piece to substantially one third of the overall height of the rail piece. In the illustrated embodiment this height X—X is substantially a quarter of the overall height of the rail piece. However, if desired, ridges may be located at a greater height which does not exceed substantially one half of the overall height of the rail piece.

The illustrated ridges 1 and 1a are clear-cut angles rather than otherwise. However, if desired, rounded ridges may be provided instead of such ridges.

Figure 2C:
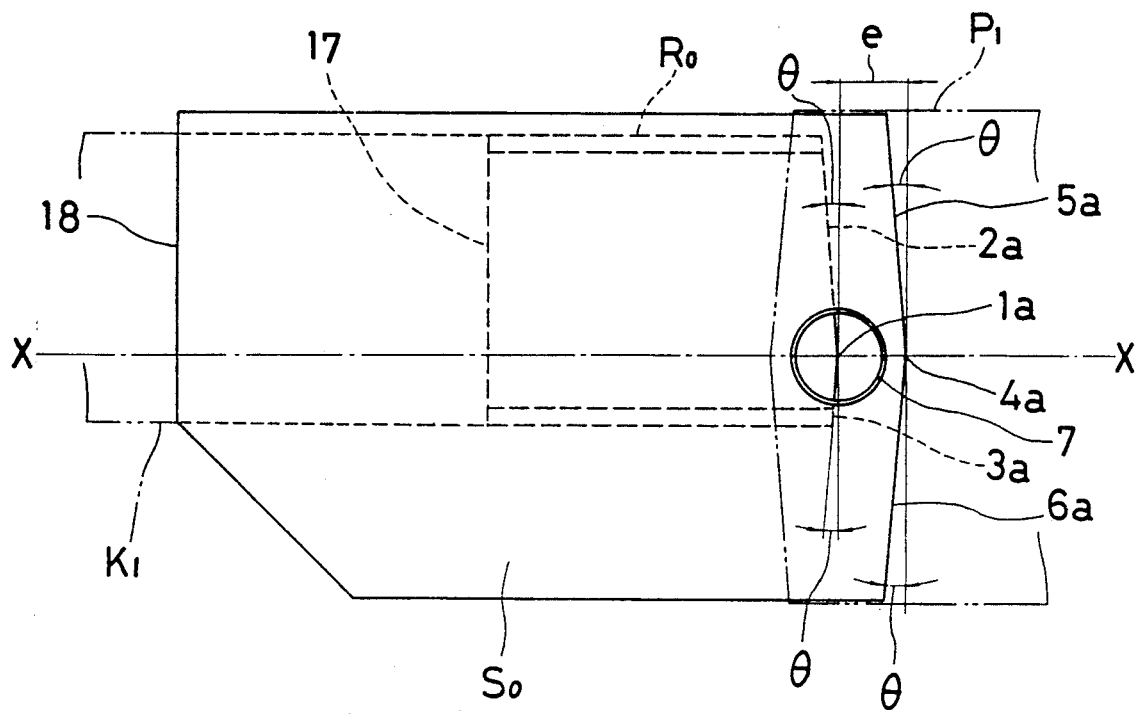
FIG. 2(c) is a front view of a leftmost side plate of the flexible rail which is welded to a leftmost rail piece and to a nonflexible rail.

The leftmost, or foremost rail piece $R_o$ has the same construction as the intermediate piece except that each of opposed side walls of the leftmost rail piece $R_o$ has a front vertical end face 17 and a rear curved end face (FIG. 2(c) and FIG. 3). The rear curved end face of the side wall is shaped in the same manner as the rear curved end face of each side wall of the intermediate rail piece.

Figure 2D:
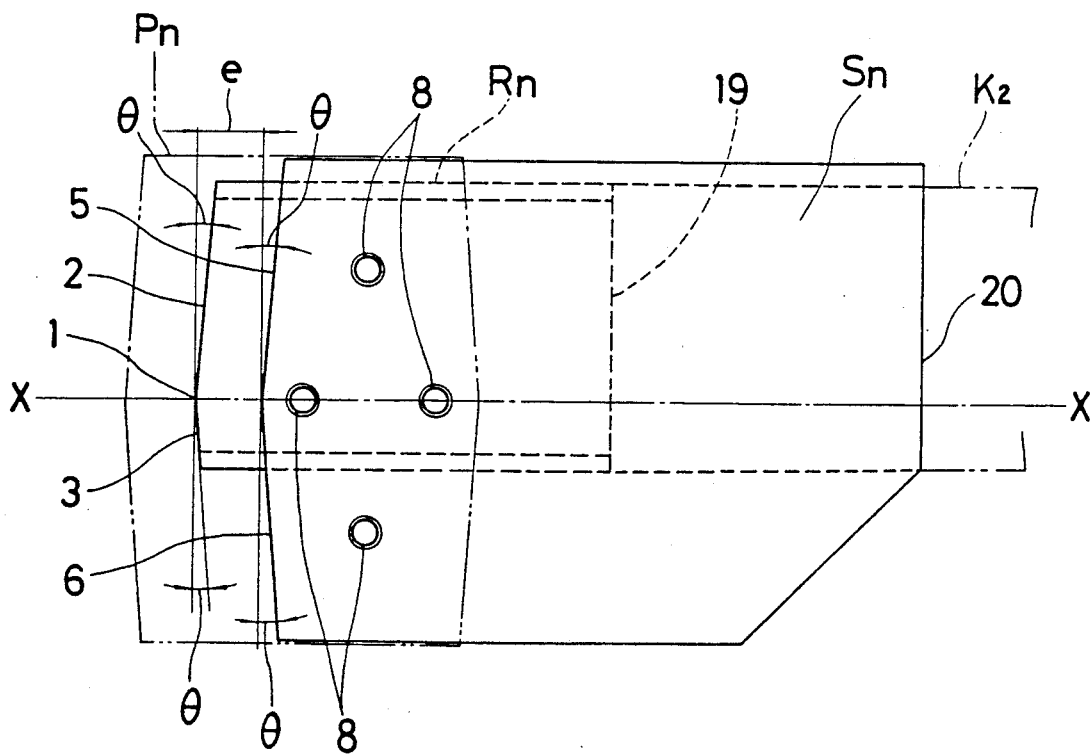
FIG. 2(d) is a front view of a rightmost side plate of the flexible rail which is connected to a rightmost rail piece and to a nonflexible rail.

The rightmost, or rearmost rail piece $R_n$ has the same construction as the intermediate rail piece except that each of opposed side walls of the rightmost rail piece $R_n$ has a front curved end face and a rear vertical end face 19 (FIG. 2(d) and FIG. 3). The front curved end face of the side wall is shaped in the same manner as the front curved end face of each side wall of the intermediate rail piece.

As described hereinafter, the opposed bottom portions 20 of the rail pieces serve to support the rollers of a roller chain.

A pair of opposed side plates are welded to the respective side walls of each rail piece. Reference numeral $S_0$ designates the side plates welded to the side walls of the foremost rail piece $R_0$. Reference numeral $S_n$ designates the side plates welded to the side walls of the rearmost rail piece $R_n$. Side plates $S_1$ to $S_{n-1}$ (intermediate side plates) are welded to the side walls of the intermediate rail pieces $R_1$ to $R_{n-1}$, respectively.

Each side plate has a greater vertical dimension than the rail piece, and has a top located at a slightly higher level than the top of the rail piece and a bottom located at a considerably lower level than the bottom of the rail piece.

As with each side wall of each intermediate rail piece, each intermediate side plate has a pair of opposed ridges 4 and 4a which are located at the same height as the ridges 1 and 1a of the rail piece, i.e., at the height X—X. And the intermediate side plate has a pair of upper inclined end faces 5 and 5a which originate from the ridges 4 and 4a, respectively, and terminates at the top of the side plate and a pair of lower inclined end faces 6 and 6a which originate from the ridges 4 and 4a, respectively, and terminates at the bottom of the side plate.

The angles at which the upper and lower end faces of the intermediate side plate are inclined are the same as the upper and lower end faces of each side wall of the intermediate rail piece, i.e., substantially 4 degrees. These angles are designated by the letter $\theta$ in FIG. 2(a).

The intermediate side plate has substantially the same maximum width as the intermediate rail piece. In other words, the ridges 4 and 4a of the intermediate side plate has substantially the same distance between them as the ridges 1 and 1a of the side wall of the intermediate rail piece. However, the intermediate side plate is located such that the widest portion thereof, i.e., the portion between the ridges 4 and 4a, laps over the widest portion of the associated intermediate rail piece not exactly, but partly. To be more exact, the intermediate side plate is so located relative to the associated intermediate rail piece that the widest portion of the intermediate side plate projects rearward from the rear ridge 1a of the intermediate rail piece by substantially one fifth or one sixth of the distance between the ridges 4 and 4a, as indicated by the letter e.

The portion of the intermediate side plate projecting rearward from the rear end face of the side wall of the associated intermediate rail piece is in partial contact with the side wall of the intermediate rail piece immediately at the back, as will be described later.

The widest portion of the intermediate side plate is a substantially central portion which divides the whole side plate into substantially equal halves.

Each foremost side plate $S_O$ is considerably larger than the intermediate side plate, and has a front vertical end face 18 and a rear curved end face which is shaped in the same manner as the rear curved end face of the intermediate side plate (FIG. 2(c) and FIG. 3).

Each rearmost side plate $S_n$ is also considerably larger than the intermediate side plate, and has a rear vertical end face 20 and a front curved end face which is shaped in the same manner as the front curved end face of the intermediate side plate (FIG. 2(d) and FIG. 3).

The intermediate side plate has plural small threaded openings 8 and a large unthreaded opening 7. As shown in FIG. 2(a), the large opening 7 has a center which coincides exactly with the rear ridges 1a of the associated intermediate rail piece as viewed from the side of the intermediate side plate. In other words, the center of the large opening 7 is in alignment with the line connecting the rear ridges 1a of the associated intermediate rail piece. Thus, the center of the large opening 7 is located at the height X—X and is spaced from the rear ridge 4a of the intermediate side plate by the distance e. The small threaded openings 8 are located such that the centers thereof correspond to the four vertices of a diamond shape, respectively. The upper and lower small openings are equally spaced apart from the height line X—X. The centers of the middle small openings are located at the height X—X.

Each foremost side plate $S_0$ also has a large unthreaded opening 7 located in the same manner as the large unthreaded opening 7 of the intermediate side plate, but has no threaded openings (FIG. 2(c) and FIG. 3). In contrast with this, each rearmost side plate $R_n$ has small threaded openings 8 located in the same manner as the small threaded openings 8 of the intermediate side plate, but has no large unthreaded opening (FIG. 2d and FIG. 3).

The side plates $S_0$ to $S_n$ on each side are connected to one another by connecting plates $P_1$ to $P_n$. All the connecting plates have the same shapes and sizes. The shapes and sizes of the connecting plates are the same as the shapes and sizes of the intermediate side plates $S_1$ to $S_{n-1}$.

Each connecting plate has plural small unthreaded openings 14 which correspond to and are in alignment with the small threaded openings 8 of one of the side plates (except the foremost side plate $S_0$). In addition, each connecting plate has an unthreaded opening 12 which is smaller than, but corresponds to and are concentric with the large unthreaded opening 7 of one of the side plates (except the rearmost side plate $S_n$). To be more exact, the openings 14 of the connecting plate correspond to the respective threaded openings 8 of one of the side plates, but the opening 12 of the same connecting plate corresponds to the unthreaded opening 7 of the side plate immediately in front of the foregoing one of the side plates.

Bolts 15 are screwed into the threaded openings 8 of a rear one of adjacent side plates through the unthreaded openings 14 of the connecting plate to fix the connecting plate to the rear side plate. Reference numeral 16 designates washers (FIG. 1). Reference numeral 13 designates a pivot with a larger-diameter portion 13b and with a smaller-diameter portion 13a (FIG. 1). The smaller-diameter portion 13a is fixed, or welded, into the opening 12 of the connecting plate. The larger-diameter portion 13b is not fixed, but fitted into the opening 7 of the front one of the adjacent side plates in such a manner that the front side plate may turn on the larger-diameter portion 13b. Hence, the rear side plate also may turn about the larger-diameter portion 13b of the same pivot 13. Thus, the adjacent side plates are connected, by the connecting plate, to each other for pivotal movement about the pivot 13.

Therefore, the rail piece, the side plates fixed to the rail piece, and the connecting plates fixed to the side plates may turn, in one united body, on the pivot 13

Each connecting plate has a pair of ridges 9 and 9a located at the height X—X. Therefore, the ridges 1 and 1a of the rail pieces, the ridges 4 and 4a of the side plates and the ridges 9 and 9a of the connecting plates are all located at the same height X—X.

Numerals 10 and 10a designate upper opposed inclined end faces of the connecting plate. Numerals 11 and 11a designate lower opposed inclined end faces of the connecting plate.

As may be understood from the foregoing description, in the illustrated embodiment the upper and lower opposed end faces of the rail pieces, of the side plates and of the connecting plates are all inclined at the same angles, namely, substantially 4 degrees.

However, if desired, a larger or smaller angle may be used. This angle may be selected from a range of substantially 2 degrees to substantially 10 degrees. Also, if desired, the lower end faces may be inclined at different angles from the upper end faces.

The foremost side plate $S_0$ is not only welded to the foremost rail piece $R_0$, but also may be welded to a nonflexible rail $K_1$. This rail $K_1$ has one end which is in contact with the vertical end faces 17 (front faces) of the side walls of the foremost rail piece (FIG. 2 (c) and FIG. 3).

Similarly, the rearmost side plate $S_n$ is not only welded to the rearmost rail piece $R_n$, but also may be welded to a non-flexible rail $K_2$. This rail $K_2$ has one end which is in contact with the vertical end faces 19 (rear faces) of the side walls of the rearmost rail piece (FIGS. 2(d) and FIG. 3).

Adjacent rail pieces are in contact with each other at the ridges thereof. For example, the second rail piece $R_1$ is in contact with the foremost rail piece $R_0$ at its front ridges 1 and is in contact with the third rail piece $R_2$ at its rear ridges 1a.

Similarly, adjacent side plates are in contact with each other at the ridges thereof For example, the second side plate $S_1$ is in contact with the foremost side plate $S_0$ at its front ridge 4 and is in contact with the third side plate $S_2$ at its rear ridge 4a.

Also, adjacent connecting plates are in contact with each other. For example, the second connecting plate $P_2$ is in contact with the foremost (first) connecting plate $P_1$ at its front ridge 9 and is in contact with the third connecting plate $P_3$ at its rear ridge 9a.

The inner spaces of the rail pieces form a continuous path through which a roller conveyor may be passed.

Action of the Flexible Rail

The construction of the flexible rail F1 is as described above.

Since the adjacent side plates on each side are connected to each other for pivotal movement (by the connecting plates) as described before, the side plates and the rail pieces are capable of making pivotal movements.

Figure 5:
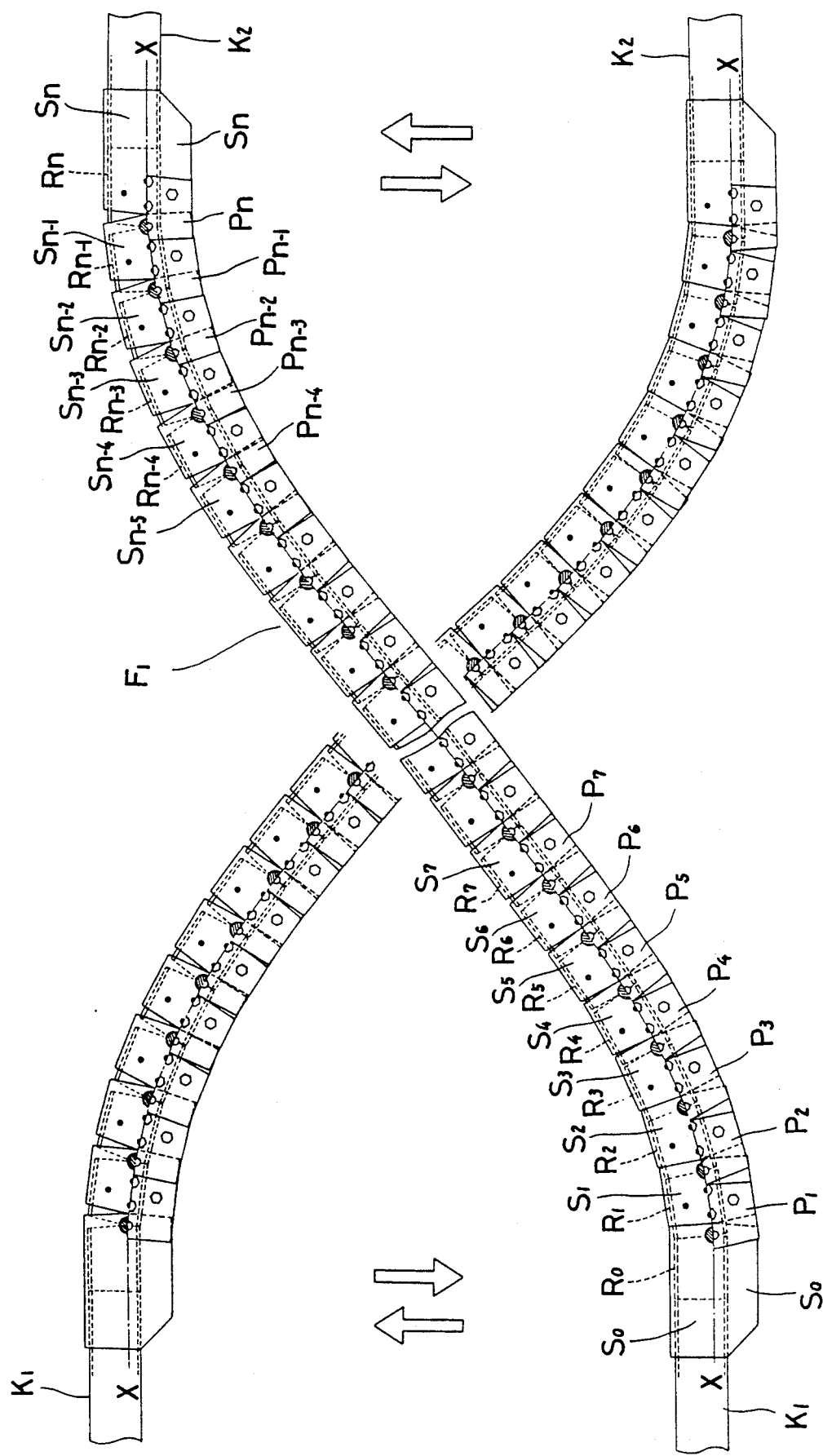
FIG. 5 shows two possible flexures of the flexible rail.
Figure 6:
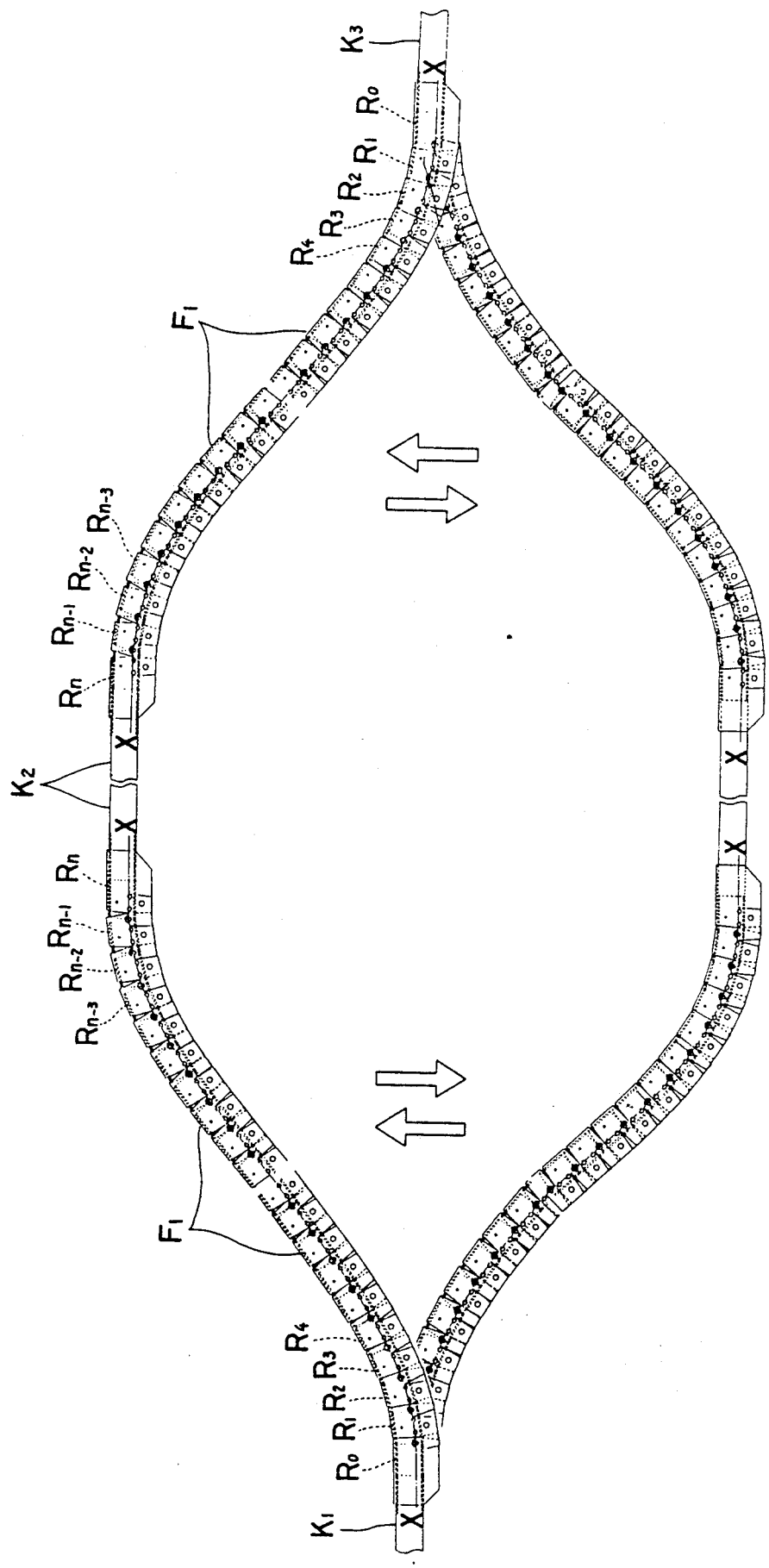
FIG. 6 shows possible flexures of two units of the flexible rail.

If one of the nonflexible rails $K_1$ and $K_2$ is moved vertically with the other nonflexible rail fixed. the flexible rail F1 flexes, or makes a wavy motion (FIG. 5).

As shown in FIG. 5, if the rail $K_2$ is moved downward with the rail $K_1$ fixed or if the rail $K_1$ is moved upward with the rail $K_2$ fixed, the flexible rail flexes with the lower end faces of rail pieces nearer to the rail $K_1$ coming into contact with each other, with central rail pieces remaining in contact with each other only at the ridges thereof, and with the upper end faces of rail pieces nearer to the rail $K_2$ coming into contact with each other. The side plates and the connecting plates behave similarly to the rail pieces while the flexible rail flexes.

Also as shown in FIG. 5, if the rail $K_2$ is moved upward with the rail $K_1$ fixed or if the rail $K_1$ is moved downward with the rail $K_2$ fixed, the flexible rail flexes with the upper inclined end faces of rail pieces nearer to the rail $K_1$ coming into contact with each other, with central rail pieces remaining in contact with each other only at the ridges thereof, and with the lower inclined end faces of rail pieces nearer to the rail $K_2$ coming into contact with each other. The side plates and the connecting plates behave similarly to the rail pieces while the flexible rail flexes.

As described hereinafter, a roller chain is passed through the continuous path formed by the inner spaces of the rail pieces. The roller chain is moved through the path. When the roller chain is moved through the path, the rollers (G of FIG. 3) of the roller chain roll on the opposed bottom portions 20 of the rail pieces. As described above, when the flexible rail flexes, some of the rail pieces come into contact with each other at the lower inclined end faces thereof and, hence, also come into contact with each other at the bottom portions thereof, thus providing a continuous surface for supporting the rollers G of the roller chain. Therefore, when the roller chain moves on such rail pieces, the rollers G of the roller chain may certainly roll smoothly on such rail pieces. However, when the roller chain moves on the rail pieces which remain in contact with each other only at the ridges thereof and on the rail pieces which are in contact with each other at the upper inclined end faces thereof, the rollers of the chain must pass over the gaps between the bottom portions of such rail pieces. Therefore, the gaps between all the rail pieces should not be or become so large that the rollers of the roller chain may get into the gaps to stop the roller chain from moving through the flexible rail. Although, if desired, the ridges 1 and 1a may be located at a height which is greater than substantially a quarter of the overall height of the rail piece, but does not exceed substantially one half of the overall height of the rail piece as described previously, the ridges 1 and 1a should preferably be selected from a range of substantially a quarter of the overall height of the rail piece to substantially one third of the overall height of the rail piece in order to provide as small gaps as possible between the rail pieces. As described before, in the illustrated embodiment the ridges 1 and 1a are located at a height of substantially a quarter of the overall height of the rail piece. In addition, although the angles of the upper and lower inclined end faces 2 and 2a of each rail piece to vertical planes may be selected from a range of substantially 2 degrees to substantially 10 degrees, the angles of the end faces 2 and 2a should preferably be substantially 4 degrees for the same purpose, namely, the provision of as small gas as possible. As described before, this angle is substantially 4 degrees in the illustrated embodiment.

Modification of First Flexible Rail

As may be seen from FIG. 5, when the flexible rail Fl flexes, or makes a wavy motion, rail pieces nearer to one of the nonflexible rails $K_1$ and $K_2$ comes into contact with each other at the upper or lower inclined end faces thereof. Rail pieces nearer to the other nonflexible rail behave likewise. Central rail pieces remain in contact with each other only at the ridges 1 and 1a thereof. It is also the case with the other two components of the flexible rail, namely, the side plates and the connecting plates. When passing through the flexible rail, the roller chain may be supported more stably by the adjacent components which are in contact with each other at the upper or lower inclined end faces thereof than by the adjacent components which remain in contact with each other only at the ridges thereof. Thus, it is preferable that the flexible rail includes many components which may come into contact with each other at upper or lower inclined end faces. It is a particularly important consideration if a roller chain passing through the flexible rail is used to convey heavy objects. But if lightweight objects are to be conveyed by the roller chain, only one or two of the three components of the flexible rail may be provided with upper and lower inclined opposite end faces. For example, only rail pieces may be formed as illustrated, and rectangular side plates and rectangular connecting plates may be used.

Second Flexible Rail

Figure 7:
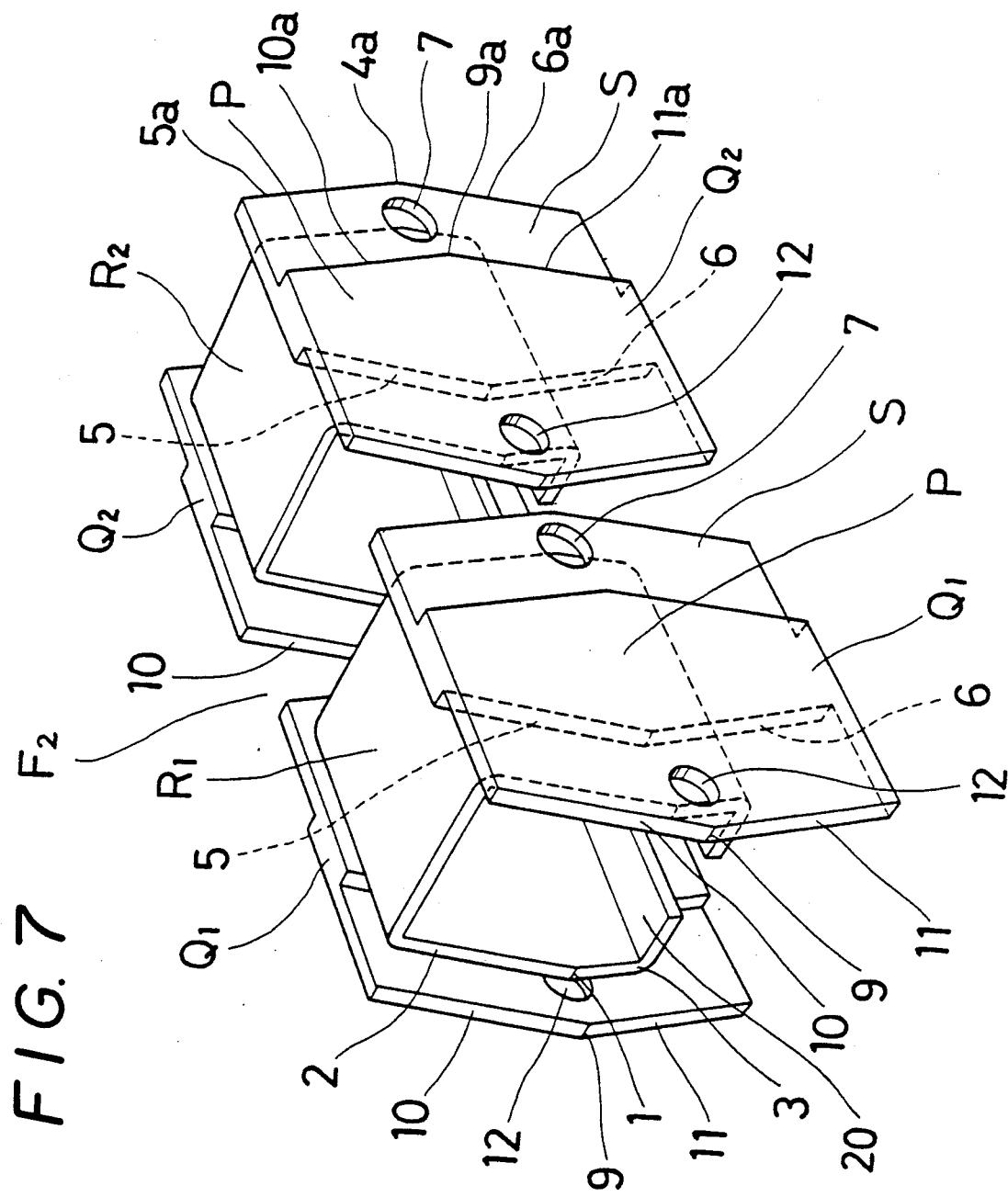
FIG. 7 is a perspective view of major components which may be used to provide another flexible rail of the invention.

According to the invention, components of FIG. 7 may be used to provide another flexible rail.

That is, rail pieces may be connected to one another by connecting members P formed integrally with side plates S. In this embodiment, therefore, it is not necessary to provide any threaded openings in the side plates S nor in the connecting members P. Parts the same as or corresponding to those of the flexible rail Fl are designated by the same reference numerals.

The flexible rail F2 with such components may flex in the same manner as the flexible rail F1.

Third Flexible Rail

Figure 8:
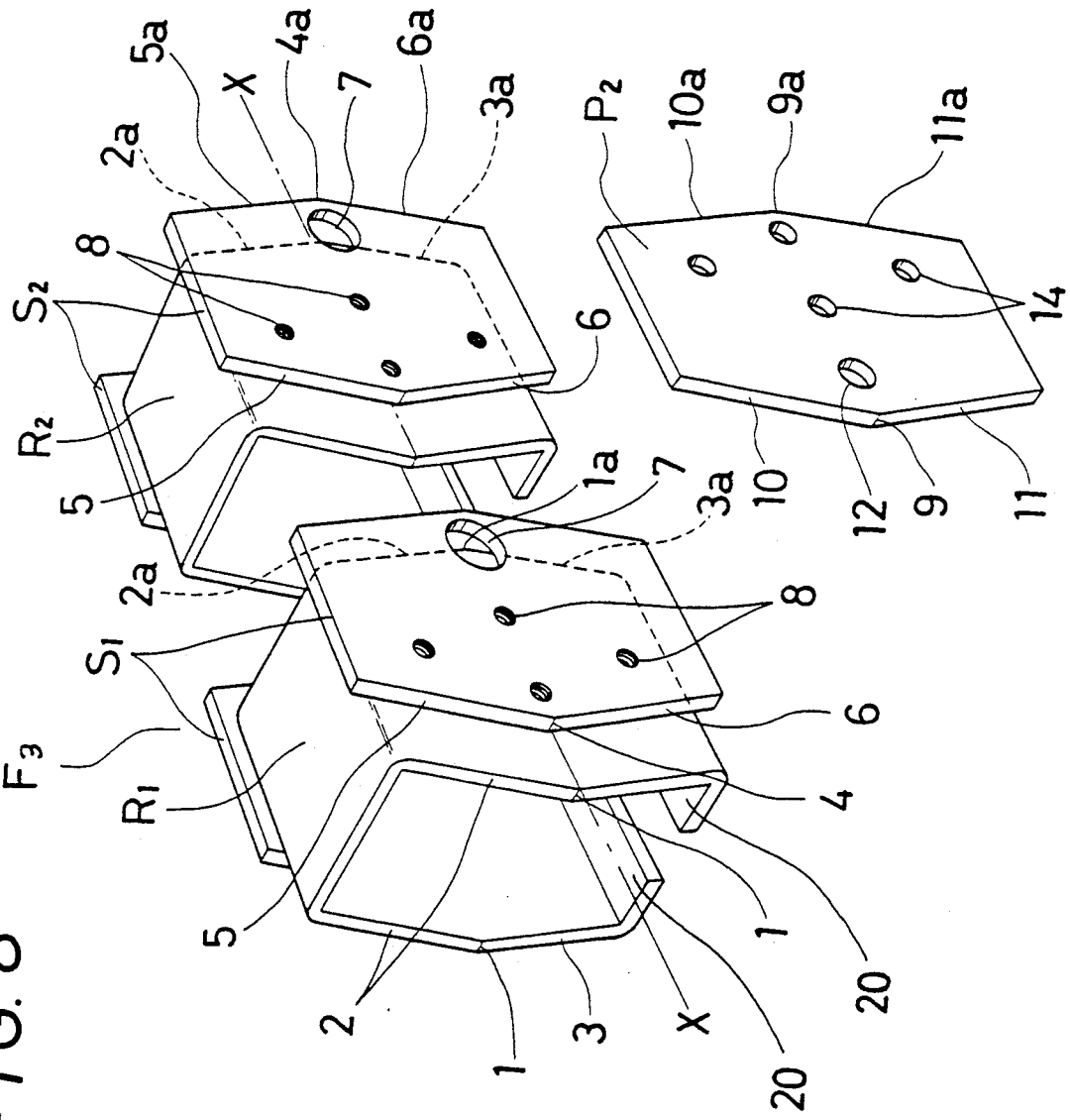
FIG. 8 is a perspective view of major components which may be used to provide still another flexible rail of the invention.

Also, according to the invention, components of FIG. 8 may be used to provide still another flexible rail.

That is, it is possible to use a rail piece with front and rear ridges 1 and 1a located at the middle of the height of the rail piece. As with the flexible rail Fl, ridges 4 and 4a of side plates and ridges 9 and 9a of a connecting plate are located at the same height as the ridges 1 and 1a of the rail piece. Parts the same as or corresponding to those of the flexible rail Fl are designated by the same reference numerals.

In this embodiment the upper and lower end faces of the rail piece should preferably be inclined at as small angles as possible to enable the rollers G of the roller chain to roll smoothly on the opposed bottom portions of the rail pieces.

The flexible rail F3 with such components may also flex in the same as the flexible rail Fl.

Fourth Flexible Rail

Figure 9:
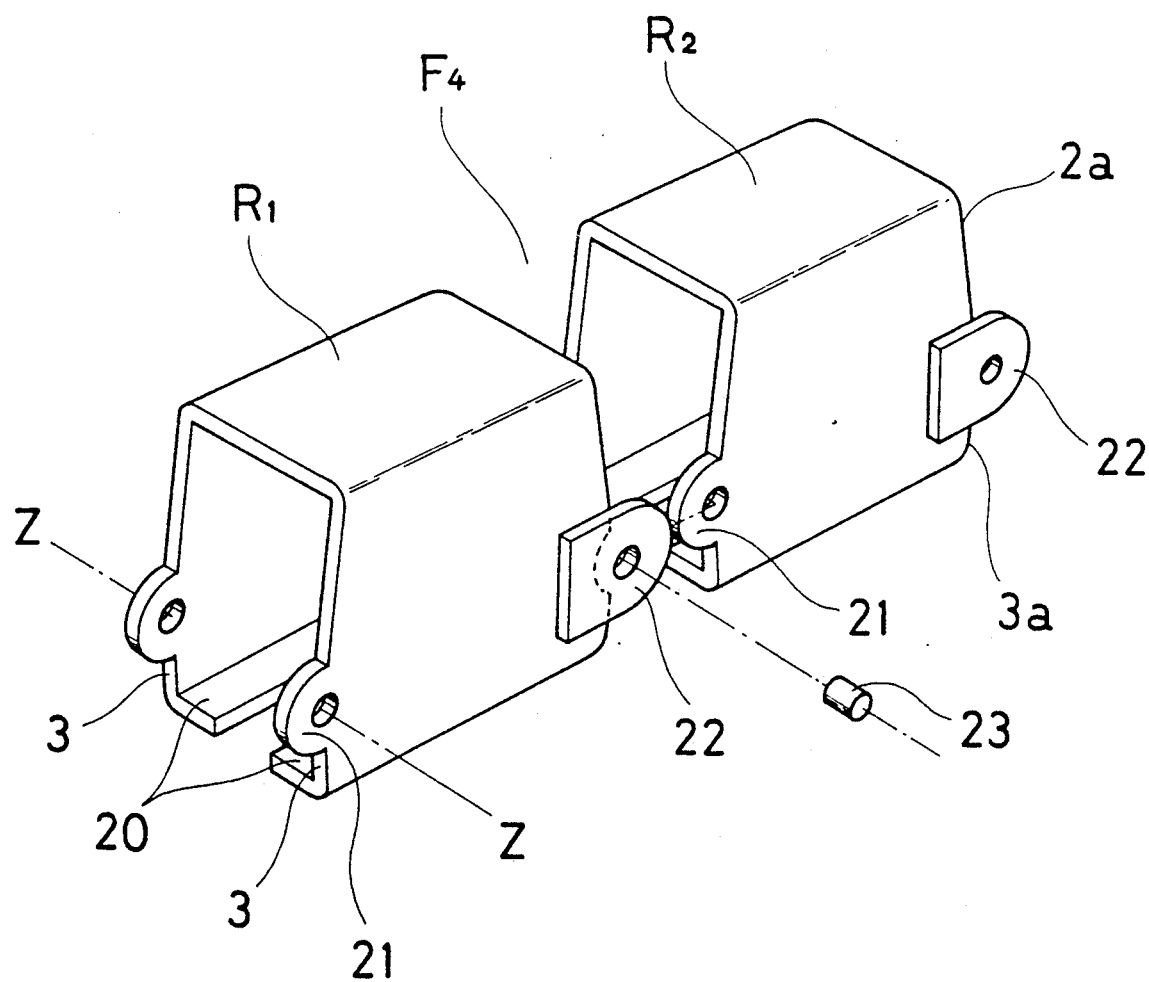
FIG. 9 is a perspective view of major components which may be used to provide a further flexible rail of the invention.

Also, according to the invention, components of FIG. 9 may be used to provide a further flexible rail.

That is, a flexible rail may be provided without using any side plate nor connecting plate. Instead, it is possible to use a rail piece with a pair of front bearing means 21 and a pair of rear bearing means 22. The rear bearing means 22 are located in more outward positions than the front bearing means 21. Adjacent rail pieces are connected to each other by means of a pivot 23 inserted into an opening of the rear bearing means 22 of the front rail piece and into an opening of the front bearing means 21 of the rear rail piece. The pivot 23 may be welded either into the opening of the rear bearing mean 22 of the front rail piece or into the opening of the front bearing means 21 of the rear rail piece. Thus each rail piece is capable of pivotal movement. The openings of the bearing means 21 and 22 are located at substantially the same height as the ridges 1 and 1a of the rail piece of the flexible rail Fl.

Parts the same as or corresponding to those of the flexible rail Fl are designated by the same reference numerals.

In this embodiment, each of the opposed side walls of the rail piece is provided with a recess which is located adjacent to the associated rear bearing means 22 for receiving one of the front bearing means 21 of the next rail piece therein.

The flexible rail F4 with such components may also flex in the same manner as the flexible rail Fl.

Construction of Electrodeposition Coating System with the Flexible Rail

One possible use of the flexible rail of the invention is in a system for electrodeposition coating automobile parts, electrical components or other kinds of parts with paint. Although any one of the flexible rails Fl to F4 may be employed for such a system, description will now be given of such a system with the flexible rail Fl with reference to FIGS. 10 and 11.

Figure 10:
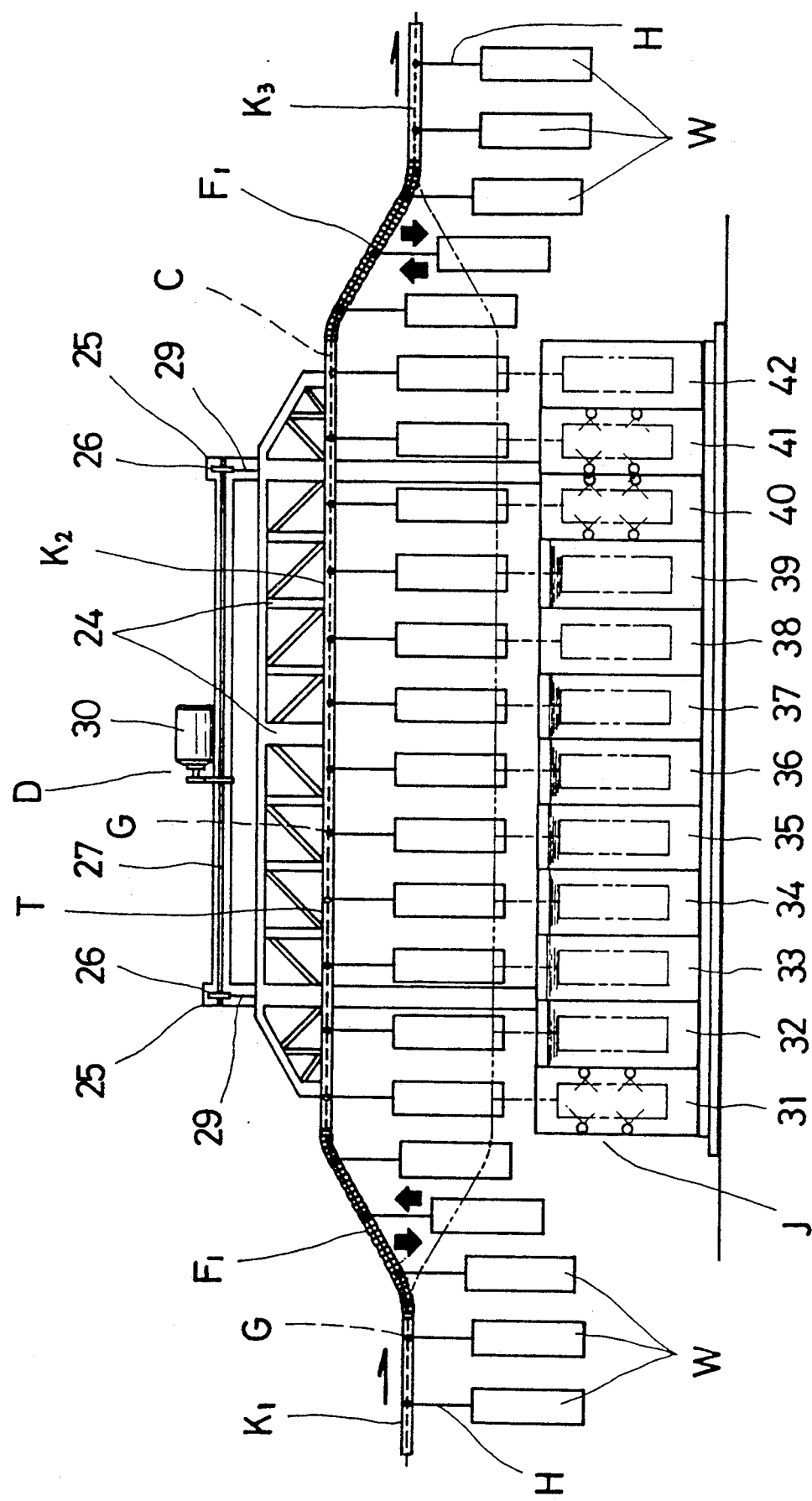
FIG. 10 is a front view of an electrodeposition coating system with a trolley conveyor having the flexible rail of FIGS. 1 to 6.
Figure 11:
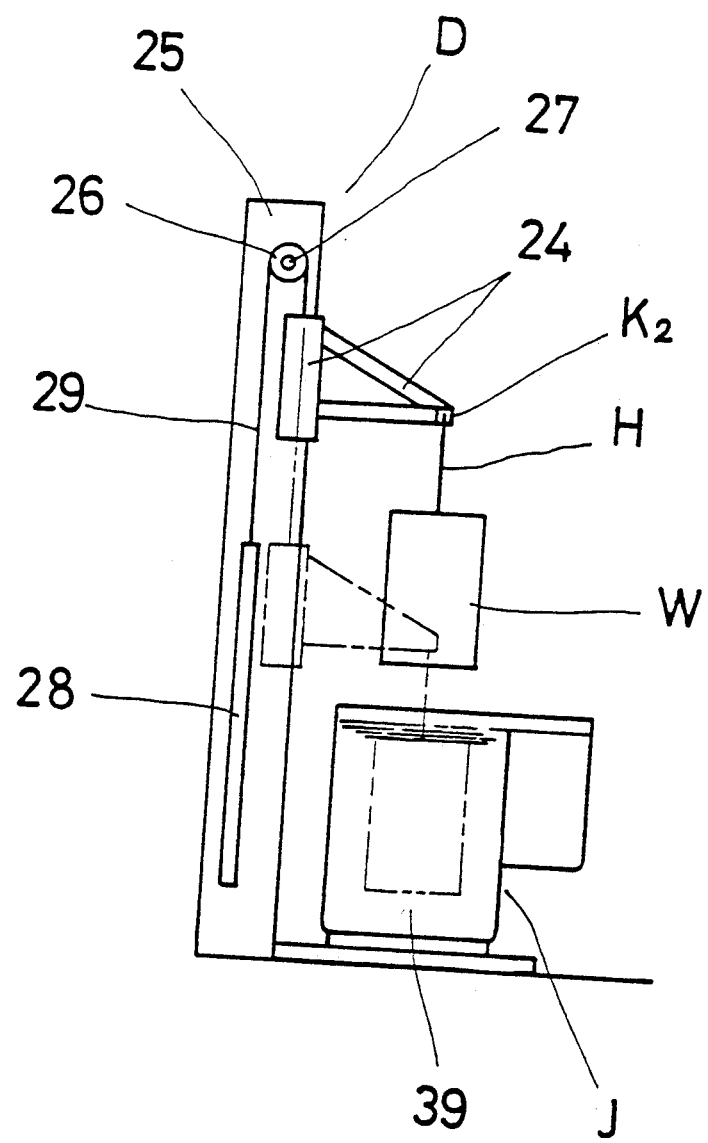
FIG. 11 is a simplified side view of the electrodeposition coating system of FIG. 10.

The electrodeposition coating system of FIGS. 10 and 11 includes a trolley conveyor T which comprises (i) a front non-flexible rail $K_1$, (ii) a front flexible rail Fl, (iii) a non-flexible, but vertically-movable central rail $K_2$, (iv) a rear flexible rail Fl, (v) a rear nonflexible rail $K_3$, and (vi) a roller chain C passed through all these rails. The front and rear nonflexible rails $K_1$ and $K_2$ are fixed rails.

Since the flexible rail Fl includes hollow rail pieces, it may be said that the flexible rail Fl is a hollow rail. Each of the nonflexible rails $K_1$, $K_2$ and $K_3$ is also a hollow rail. But, unlike the flexible rail Fl, each nonflexible rail does not comprises rail pieces, but is a single continuous rail. Although not shown, each nonflexible rail has the same vertical cross section as the rail piece of the flexible rail F1 (FIGS. 4(a) and 4(b), and has opposed bottom portions which are similar to the opposed bottom portions 20 of the rail piece of the flexible rail F1, but extend continuously along the entire length of the nonflexible rail.

The front flexible rail F1 is connected to the front nonflexible rail $K_1$ as shown in FIG. 2(c), and is connected to the central nonflexible rail $K_2$ as shown in FIG. 2(d). The rear flexible rail F1 is likewise connected to the central nonflexible rail $K_2$ and to the rear nonflexible rail $K_3$. Thus, the rails $K_1$, $F_1$, $K_2$, $F_1$ and $K_3$ provide a continuous inner path for the roller chain C together.

The roller chain C includes rollers G. The roller chain C is intermittently moved (by means not shown) through the foregoing continuous path with its rollers G rolling on the opposed bottom portions of the rails. Hangers H (FIG. 11) are suspended from the roller chain C through the spaces between the opposed bottom portions of the rails. Materials, or works W to be electrodeposition coated with paint, such as automobile parts or electrical components, are hung from the hangers H.

The electrodeposition coating system further includes a works support structure D. This structure includes a pair of columns 25 connected to each other by a beam. A horizontal driving shaft 27 is located along the beam. A pair of sprockets or pulleys 26 are mounted on opposed end portions of the driving shaft 27, respectively. Connecting means 29, such as chains, engage the sprockets (or pulleys) 26. A balancer 28 is connected to one end of each connecting means 29. A support frame 24 is connected to the other ends of the connecting means 29. The support frame 24 comprises an upright member and a bracket member projecting from the upright member (FIG. 11). The central rail $K_2$ is connected to the distal end of the bracket member (FIG. 11).

An electric motor 30 is located on the beam. The motor 30 is rotatable in either of opposite directions. The driving shaft 27 is connected to the motor 30 such that the former 27 is rotated when the latter 30 is rotated. When the driving shaft 27 is rotated, the sprockets (or pulleys) 26 are rotated to move the support frame 24 upwardly or downwardly. The central rail $K_2$ is thus vertically movable.

Plural tanks 31 to 42 are located on a floor. The tanks are positioned below and along the central rail $K_2$. A work W suspended from a hanger H is lowered into the tanks 31 to 42 in the order mentioned. In a first tank 31 the work W is degreased by water discharged from nozzles or showers. In a second tank 32 the work is alkaline degreased. In a third tank 33 the work is rinsed. In a fourth tank 34 the work is prepared in its surface. In a fifth tank 35 the work is treated with phosphoric acid and zinc. In a sixth tank 36 the work is rinsed again. In a seventh tank 37 the work is rinsed with pure water. In an eighth tank 38 drops of the liquid on the work are allowed to fall therein. In a ninth tank 39 the work is electrodeposition coated with paint. In tenth and eleventh tanks 40 the work is rinsed by water discharged from nozzles or showers. In a last tank 42 drops of the liquid on the work are allowed to fall therein.

The tanks 32 to 37 and 39 are filled with liquids necessary for the foregoing treatments in the respective tanks. The tanks 31, 40 and 41 are not filled with any liquid, but are equipped with nozzles or showers therein. The tanks 38 and 42 are not filled with any liquid, nor are they equipped with nozzles or showers.

Operation of the Electrodeposition Coating System with the Flexible Rail

As mentioned before, the roller chain C is moved intermittently through the continuous path provided by the rails $K_1$, $F_1$, $K_2$, $F_1$ and $K_3$. Each time the roller chain C is stopped, a work W may be manually hung from a hanger H by an operator (not shown) standing on a given position below the front end portion of the nonflexible rail $K_1$. The intermittent movement of the roller chain C is so made that a work W is moved continuously from a position directly above a tank to a position directly above the next tank. When the work W has come to a position directly above each tank, the roller chain C is stopped for a period of time required for the treatment of the work in the tank. For example, this required period of time may be about 2 or 3 minutes.

At first the support frame 24 is in an upper position (FIGS. 10 and 11) and, hence, the front flexible rail F1 is in the state of being flexed (, or being in a wavy motion) from the lower left to the upper right (FIG. 5) while the rear flexible rail F1 is in the state of being flexed from the upper left to the lower right (FIG. 5). The work W hung from a hanger H is intermittently moved along the fixed rail $K_1$ and along the front flexible rail F1. By moving along the front flexible rail F1, the work W reaches a height from which the work W may be lowered into the first tank 31. When the work W has come to a position directly above the first tank 31, the roller chain C is stopped and the motor 30 is operated to lower the support frame 24 until the central rail $K_2$ comes to a lower position indicated by dotted lines of FIGS. 10 and 11 which is directly above the tanks. Concomitantly with the lowering of the central rail $K_2$, the front and rear flexible rails F1 flex, or make wavy motions, with the right end of the front flexible rail and the left end of the rear flexible rail lowering (, as indicated by thick arrows of FIG. 10). Since the other ends of the flexible rails are connected to the fixed rails, the other ends thereof are not moved. These motions of the flexible rails have been described in detail with reference to FIG. 5. Thus, the work W is lowered into the first tank 31 wherein the work W is degreased. After the work W has been degreased, the motor 30 is rotated in the direction opposite to the direction in which the motor 30 has been rotated to lower the support frame 24. Thus, the support frame 24 is moved back to its upper position to remove the work W from the tank 31. Concomitantly with the upward movement of the central rail $K_2$, the front and rear flexible rails F1 flex, or make wavy motions, with the right end of the front flexible rail and the left end of the rear flexible rail moving upward (, as indicated by thick arrows of FIG. 10).

Then, the roller chain C is restarted to move the work W to a position directly above the second tank 32. When the work has come to that position, the roller chain C is stopped again. Then, the support frame 24 is lowered again to place the work W in the second tank 32. At the same time that the first work W is placed in the second tank 32, the next work W is placed in the first tank 31. After the first and second works W have been treated in the tanks 31 and 32, respectively, the support frame 24 is raised again. Then, the roller chain C is restarted.

Thus, the intermittent movement of the roller chain C and the vertical movements of the support frame 24 enables each work W hung from one of the hangers H to be treated in each tank. After the work has been treated in all the tanks, the work is moved along the rear flexible rail Fl and along the fixed rail K3 as indicated by an arrow of FIG. 10, to be conveyed to a furnace where the work is baked to dry the paint thereon (not shown).

The flexible rails Fl flex very smoothly concomitantly with the vertical movements of the central rail K2. Therefore, the support frame 24 may be vertically moved very smoothly.

In the foregoing electrodeposition coating system, the flexible rails are used as components of the trolley conveyor. Other possible uses of the flexible rail are for a cross bar conveyor and for a pallet conveyor, for example.

Referring to FIG. 11, if desired, an additional works support structure may be provided on the side opposite to the works support structure D (with the tanks located between) such that the central rail K2 and, hence, the works W may be supported in a more stable manner.

Also, if desired, a hydraulic or pneumatic cylinder may be used instead of the electric motor 30.

What is claimed is:

1. A flexible rail comprising
   (a) a plurality of hollow rail pieces each having (i) a top, (ii) opposed side walls, (iii) opposed open ends, (iv) a pair of laterally opposed bottom portions on which a roller chain may be supported, (v) a bottom space between the opposed bottom portions, and (vi) a generally inverted U-shaped vertical cross section,
   a hanger being capable of being suspended from a roller chain supported on the opposed bottom portions through said space,
   a pair of laterally opposed side plates fixed to the respective side walls of each of the rail pieces such that the opposed side plates overlap the opposed side walls thereof,
   (c) a pair of laterally opposed connecting plates each associated with adjacent side plates on one of opposed sides, each of the connecting plates overlapping both of adjacent side plates, but being fixed to only a rear one thereof, and
   (d) a pair of pivotal means provided in conjunction with the opposed side plates, respectively, and each connecting a front one of adjacent side plates on one of the opposed sides and a connecting plate on the same side for pivotal movements about a common axis.

2. A flexible rail in accordance with claim 1 wherein at least one of the rail piece, the side plate and the connecting plate includes longitudinally opposed ridges and upper and lower portions which are tapered from the ridges in an upward direction and in a downward direction, respectively.

3. A flexible rail in accordance with claim 2 wherein each of the opposed side walls of each of the rail pieces includes longitudinally opposed ridges and upper and lower portions which are tapered from the ridges in an upward direction and in a downward direction, respectively.

4. A flexible rail in accordance with claim 3 wherein the common axis about which a front one of adjacent side plates on one of the opposed sides and a connecting plate on the same side are capable of making pivotal movements is in alignment with a line connecting ridge formed where a rear inclined end face of the upper tapered portion of one of the opposed side walls of the rail piece meets a rear inclined end face of the lower tapered portion thereof and a ridge formed where a rear inclined end face of the upper tapered portion of the other of the opposed side walls of the rail piece meets a rear inclined end face of the lower tapered portion thereof.

5. A flexible rail in accordance with claim 3 wherein the opposed ridges of each of the side walls of each of the rail pieces are located within a lower half of the height of the rail piece.

6. A flexible rail in accordance with claim 5 wherein the opposed ridges of each of the side walls of each of the rail pieces are located at a level selected from a range of substantially a quarter of the height of the rail piece to substantially one third thereof.

7. A flexible rail in accordance with claim 3 wherein the connecting plate is formed integrally with a rear one of adjacent side plates.

8. A flexible rail in accordance with claim 4 wherein the opposed ridges of each of the side walls of each of the rail pieces are located within a lower half of the height of the rail piece.

9. A flexible rail in accordance with claim 4 wherein the connecting plate is formed integrally with a rear one of adjacent side plates.

10. A flexible rail in accordance with claim 8 wherein the opposoed ridges of each of the side walls of each of the rail pieces are located at a level selected from a range of substantially a quarter of the height of the rail piece to substantially one third thereof.

11. A flexible rail in accordance with claim 2 wherein
    (a) each of the opposed side walls of each of the rail pieces includes longitudinally opposed ridges and upper and lower portions which are tapered from the ridges in an upward direction and in a downward direction, respectively,
    (b) each of the side plates includes longitudinally opposed ridges and upper and lower portions which are tapered from the ridges in an upward direction and in a downward direction, respectively,
    (c) each of the connecting plates includes longitudinally opposed ridges and upper and lower portions which are tapered from the ridges in an upward direction and in a downward direction, respectively, and
    (d) all said ridges being located on the same level.

12. A flexible rail in accordance with claim 11 wherein the common axis about which a front one of adjacent side plates on one of the opposed sides and a connecting plate on the same side are capable of making pivotal movements is in alignment with a line connecting a ridge formed where a rear inclined end face of the upper tapered portion of one of the opposed side walls of the rail piece meets a rear inclined end face of the lower tapered portion thereof and a ridge formed where a rear inclined end face of the upper tapered portion of the other of the opposed side walls of the rail piece meets a rear inclined end face of the lower tapered portionn thereof.

13. A flexible rail in accordance with claim 12 wherein the opposed ridges of each of the side walls of each of the rail pieces are located within a lower half of the height of the rail piece.

14. A flexible rail in accordance with claim 12 wherein the connecting plate is formed integrally with a rear one of adjacent side plates.

15. A flexible rail in accordance with claim 13 wherein the opposed ridges of each of the side walls of each of the rail pieces are located at a level selected from a range of substantially a quarter of the height of the rail piece to substantially one third thereof.

16. A flexible rail in accordance with claim 11 wherein the opposed ridges of each of the side walls of each of the rail pieces are located within a lower half of the height of the rail piece.

17. A flexible rail in accordance with claim 16 wherein the opposed ridges of each of the side walls of each of the rail pieces are located at a level selected from a range of substantially a quarter of the height of the rail piece to substantially one third thereof.

18. A flexible rail in accordance with claim 11 wherein the connecting plate is formed integrally with a rear one of adjacent side plates.

19. A flexible rail in accordance with claim 2 wherein the connecting plate is formed integrally with a rear one of adjacent side plates.

20. A flexible rail in accordance with claim 1 wherein the connecting plate is formed integrally with a rear one of adjacent side plates.

21. A flexible rail comprising a plurality of hollow rail pieces each having
   (i) a top,
   (ii) opposed side walls,
   (iii) opposed open ends,
   (iv) a pair of laterally opposed bottom portions for supporting a roller chain,
   (v) a bottom space located between the opposed bottom portions through which a hanger may be suspended from a roller chain supported on the opposed bottom portions,
   (vi) a generally inverted U-shaped vertical cross section,
   (vii) a pair of front laterally opposed bearing means with
   (viii) a pair of rear laterally opposed bearing means with openings,
   the rear bearings means being located more outwardly than the front bearing means,
   (ix) a pair of laterally opposed recesses provided in the respective side walls of the rail piece for receiving the respective front bearing means of a next rail piece such that the openings of the front bearing means of the next, or rear rail piece are aligned with the openings of the rear bearing means of the front rail piece, respectively,
   (x) each of the side walls including an upper portion tapered in an upward direction and a lower portion tapered in a downward direction,
   the upper tapered portion having a front inclined end face which originates from a top of the front bearing means and terminates at a top of the side wall and a rear inclined end face which originates from a top of the recess and terminates at the top of the side wall,
   the lower tapered portion having a front inclined end face which originates from a bottom of the front bearing means and terminates at a bottom of the side wall and a rear inclined end face which originates from a bottom of the recess and terminates at the bottom of the side wall, and
   (xi) a pair of laterally opposed pivotal means for connecting adjacent rail pieces for pivotal movements,
      one of the pivotal means being provided through the opening of one of the rear bearing means of the front one of the adjacent rail pieces and the opening of the associated front bearing means of the rear one of the adjacent rail pieces,
      the other of the pivotal means being provided through the opening of the other rear bearing means of the front rail piece and the opening of the associated front bearing means of the rear rail piece, and
      each of the pivotal means being fixed into one of the associated openings.

22. A flexible rail in accordance with claim 21 wherein each of the bearing means is located at such a level that a center of the opening of the bearing means is positioned within a lower half of the height of the rail piece.

23. A flexible rail in accordance with claim 22 wherein each of the bearing means is located at such a level that the center of the opening of the bearing means is positioned at a level selected from a range of substantially a quarter of the height of the rail piece to substantially one third thereof.

24. A flexible conveyor comprising
   (i) nonflexible rails which each comprise a single continuous rail with an inner space extending along a length of the rail, with opposed open ends, with a pair of laterally opposed bottom portions extending continuously along the length of the rail, and with a bottom space located between the bottom portions,
   (ii) a flexible rail located between the nonflexible rails and having (a) an inner space extending along a length of the flexible rail, (b) opposed open ends connected to the non-flexible rails, (c) a pair of laterally opposed bottom portions extending substantially continuously along the length of the flexible rail, and (d) a bottom space located between the bottom portions of the flexible rail,
   (iii) a roller chain extending through the inner spaces of the nonflexible rails and of the flexible rail and having rollers supported on the opposed bottom portions of the nonflexible rails and of the flexible rail,
   (iv) hangers suspended from the roller chain through the bottom spaces of the nonflexible rails and of the flexible rail, works being capable of being hung from the hangers,
   (v) one of the nonflexible rails being fixed and the other nonflexible rail being capable of being moved vertically, and
   (vi) the flexible rail flexing concomitantly, or making a concomitant wavy motion, when the other nonflexible rail is moved vertically.

25. A flexible conveyor in accordance with claim 24 wherein the flexible rail comprises
   (a) a plurality of hollow rail pieces each having (i) a top, (ii) opposed side walls, (iii) opposed open ends, (vi) a pair of laterally opposed bottom portions for supporting the rollers of the roller chain, (v) a bottom space between the opposed bottom portions, and (vi) a generally inverted U-shaped vertical cross section,
   a pair of laterally opposed side plates fixed to the respective side walls of each of the rail pieces such that the opposed side plates overlap the opposed side walls thereof, (c) a pair of laterally opposed connecting plates each associated with adjacent side plates on one of opposed sides, each of the connecting plates overlapping both of adjacent side plates, but being fixed to only a rear one thereof, (d) a pair of pivotal means provided in conjunction with the opposed side plates, respectively, and each connecting a front one of adjacent side plates on one of the opposed sides and a connecting plate on the same side for pivotal movements about a common axis, (e) foremost and rearmost ones of the side plates being also fixed to the respective nonflexible rails, so that only foremost associated components, namely, the foremost side plates, foremost connecting plates and foremost rail piece and rearmost associated components, namely, the rearmost side plates, rearmost connecting plates and rearmost rail piece are not capable of making pivotal movement, (f) each of the opposed side walls of each of intermediate rail pieces including longitudinally opposed ridges and upper and lower portions which are tapered from the ridges in an upward direction and in a downward direction, respectively, (g) each of the opposed side walls of the foremost rail piece including only a rear ridge from which rear upper and lower inclined end faces originate, (h) each of the opposed side walls of the rearmost rail piece including only a front ridge from which front upper and lower inclined end faces originate, each of intermediate side plates including longitudinally opposed ridges and upper and lower portions which are tapered from the ridges in an upward direction and in a downward direction, respectively, (j) each of the foremost side plates including only a rear ridge from which rear upper and lower inclined end faces originate, (k) each of the rearmost side plates including only a front ridge from which front upper and lower inclined end faces originate, (l) each of the connecting plates including longitudinally opposed ridges and upper and lower portions which are tapered from the ridges in an upward direction and in a downward direction, respectively, and (m) all said ridges being located on the same level.

26. A flexible conveyor in accordance with claim 25 wherein the connecting plate is formed integrally with a rear one of adjacent side plates.

27. A flexible conveyor in accordance with claim 24 wherein the flexible rail comprises a foremost rail piece, intermediate rail pieces and a rearmost rail piece which each have (a) a top, (b) opposed side walls, (c) opposed open ends, (d) a pair of laterally opposed bottom portions for supporting the rollers of the roller chain, (e) a bottom space located between the opposed bottom portions, and (f) a generally inverted U-shaped vertical cross section each of the intermediate rail pieces further including a pair of front laterally opposed bearing means with (i) a pair of front laterally opposed bearing means with openings, (ii) a pair of rear laterally opposed bearing means with openings, the rear bearing means being located more outwardly than the front bearing means, (iii) recesses provided in the respective side walls for receiving the respective front bearing means of a next rail piece such that the openings of the front bearing means of the next rail piece are aligned with the openings of the rear bearing means of the front rail piece, respectively, (iv) each of the side walls including an upper portion tapered in an upward direction and a lower portion tapered in a downward direction, the upper tapered portion having a front inclined end face which originates from a top of the front bearing means and terminates at a top of the side wall and a rear inclined end face which originates from a top of the recess and terminates at the top of the side wall, and the lower tapered portion having a front inclined end face which originates from a bottom of the front bearing means and terminates at a bottom of the side wall and a rear inclined end face which originates from a bottom of the recess and terminates at the bottom of the side wall, (v) adjacent intermediate rail pieces being connected to each other by a pair of pivotal means for pivotal movements, one of the pivotal means being provided through the opening of one of the rear bearing means of the front one of the adjacent rail pieces and the opening of the associated front bearing means of the rear one of the adjacent rail pieces, the other of the pivotal means being provided through the opening of the other rear bearing means of the front rail piece and the opening of the associated front bearing means of the rear rail piece, and each of the pivotal means being fixed into one of the associated openings, the foremost rail piece further including (i) a pair of rear laterally opposed bearing means with openings, (ii) recesses provided in the respective side walls for receiving the respective front bearing means of a first intermediate rail piece such that the openings of the front bearing means of the first intermediate rail piece are aligned with the openings of the rear bearing means of the foremost rail piece, respectively, (iii) each of the opposed side walls of the foremost rail piece having a rear upper end face inclined forward from a top of one of the rear bearing means and a rear lower end face inclined forward from a bottom of said one of the rear bearing means, and (iv) the foremost rail piece being connected to the first intermediate rail piece by a pair of foremost pivotal means provided through the opening of one of the rear bearing means of the foremost rail piece and the opening of one of the front bearing means of the first intermediate rail piece and through the opening of the other rear bearing means of the foremost rail piece and the opening of the other front bearing means of the first intermediate rail piece, respectively, front end faces of the foremost rail piece being fixed to one of the nonflexible rails, so that the foremost pivotal means allow only the first intermediate rail piece to make pivotal pivotal movement, the rearmost rail piece further including (i) a pair of front laterally opposed bearing means with openings, (ii) each of the opposed side walls of the rearmost rail piece having a front upper end face inclined rearward from a top of one of the front bearing means and a front lower end face inclined rearward from a bottom of said one of the front bearing means, and (iii) the rearmost rail piece being connected to the last intermediate rail piece by a pair of rearmost pivotal means provided through the opening of one of the front bearing means of the rearmost rail piece and the opening of one of the rear bearing means of the last intermediate rail piece and through the opening of the other front bearing means of the rearmost rail piece and the opening of the other rear bearing means of the last intermediate rail piece, respectively, rear end faces of the rearmost rail piece being fixed to the other nonflexible rail, so that the rearmost pivotal means allow only the last intermediate rail piece to make pivotal movement, and each of the foremost and rearmost pivotal means being fixed into one of the associated openings.

28. An electrodeposition coating system comprising
(A) a flexible trolley conveyor including
  (i) first, second and third nonflexible rails which each comprise a single continuous rail with an inner space extending along a length of the rail, with opposed open ends, with a pair of laterally opposed bottom portions extending continuously along the length of the rail, and with a bottom space located between the bottom portions,
    the first and third nonflexible rails being fixed rails, and
    first and second flexible rails which each have (a) opposed open ends, (b) an inner space extending along a length of the rail, (c) a pair of laterally opposed bottom portions extending substantially continuously along the length of the rail, and (d) a bottom space located between the bottom portions of the rail,
    the first flexible rail being located between the first and second nonflexible rails and connected thereto at the respective open ends thereof, and
    the second flexible rail being located between the second and third nonflexible rails and connected thereto at the respective open ends thereof,
  (iii) a roller chain extending through the inner spaces of all the rails and having rollers supported on the opposed bottom portions of the rails, and
  (iv) hangers suspended from the roller chain through the bottom spaces of the rails,
works to be electrodeposition coated being capable of being hung from the hangers,
(B) tanks located on a floor and positioned directly below the second nonflexible rail,
(C) support means for supporting the second nonflexible rail for vertical movement,
(D) driving means for moving the support means vertically to move the second nonflexible rail between a position higher than the first and third nonflexible rails and a position lower than the first and third nonflexible rails,
(E) means for moving the roller chain intermittently so that each of works hung from the hangers stops moving when the work has come to a position directly above each of the tanks,
the driving means being operated to move the support means downwardly to move the works into the tanks when the roller chain has been stopped, and
(F) the first and second flexible rails flexing concomitantly, or making concomitant wavy motions, when the second nonflexible rail is moved vertically.

29. An electrodeposition coating system in accordance with claim 28 wherein each of the first and second flexible rails comprises
(a) a plurality of hollow rail pieces each having (i) a top, (ii) opposed side walls, (iii) opposed open ends, (iv) a pair of laterally opposed bottom portions for supporting the rollers of the roller chain, (v) a bottom space located between the opposed bottom portions, and (vi) a generally inverted U-shaped vertical cross section,
(b) a pair of laterally opposed side plates fixed to the respective side walls of each of the rail pieces such that the opposed side plates overlap the opposed side walls thereof,
(c) a pair of laterally opposed connecting plates each associated with adjacent side plates on one of opposed sides, each of the connecting plates overlapping both of adjacent side plates, but being fixed to only a rear one thereof,
(d) a pair of pivotal means provided in conjunction with the opposed side plates, respectively. and each connecting a front one of adjacent side plates on one of the opposed sides and a connecting plate on the same side for pivotal movements about a. common axis,
(e) foremost and rearmost ones of the side plates being also fixed to the respective nonflexible rails, so that only foremost associated components. namely, the foremost side plates, foremost connecting plates and foremost rail piece and rearmost associated components, namely, the rearmost side plates, rearmost connecting plates and rearmost rail piece are not capable of making pivotal movement,
(f) each of the opposed side walls of each of intermediate rail pieces including longitudinally opposed ridges and upper and lower portions which are tapered from the ridges in an upward direction and in a downward direction, respectively,
(g) each of the opposed side walls of the foremost rail piece including only a rear ridge from which rear upper and lower inclined end faces originate,
(h) each of the opposed side walls of the rearmost rail piece including only a front ridge from which front upper and lower inclined end faces originate,
(i) each of intermediate side plates including longitudinally opposed ridges and upper and lower portions which are tapered from the ridges in an upward direction and in a downward direction, respectively,
(j) each of the foremost side plates including only a rear ridge from which rear upper and lower inclined end faces originate,
(k) each of the rearmost side plates including only a front ridge from which front upper and lower inclined end faces originate,
(l) each of the connecting plates including longitudinally opposed ridges and upper and lower portions which are tapered from the ridges in an upward direction and in a downward direction, respectively, and (m) all said ridges being located on the same level.

30. An electrodeposition coating system in accordance with claim 29 wherein the connecting plate is formed integrally with a rear one of adjacent side plates.

31. An electrodeposition coating system in accordance with claim 28 wherein each of the first and second flexible rails comprises a foremost rail piece, intermediate rail pieces and a rearmost rail piece which each have (a) a top, (b) opposed side walls, (c) opposed open ends, (d) a pair of laterally opposed bottom portions for supporting the rollers of the roller chain, (e) a bottom space located between the opposed bottom portions, and (f) a generally inverted U-shaped vertical cross section, each of the intermediate rail pieces further including (i) a pair of front laterally opposed bearing means with openings, (ii) a pair of rear laterally opposed bearing means with openings, the rear bearing means being located more outwardly than the front bearing means, (iii) recesses provided in the respective side walls for receiving the respective front bearing means of a next rail piece such that the openings of the front bearing means of the next rail piece are aligned with the openings of the rear bearing means of the front rail piece, respectively, (iv) each of the side walls including an upper portion tapered in an upward direction and a lower portion tapered in a downward direction, the upper tapered portion having a front inclined end face which originates from a top of the front bearing means and terminates at a top of the side wall and a rear inclined end face which originates from a top of the recess and terminates at the top of the side wall, and the lower tapered portion having a front inclined end face which originates from a bottom of the front bearing means and terminates at a bottom of the side wall and a rear inclined end face which originates from a bottom of the recess and terminates at the bottom of the side wall, (v) adjacent intermediate rail pieces being connected to each other by a pair of pivotal means for pivotal movements, one of the pivotal means being provided through the opening of one of the rear bearing means of the front one of the adjacent rail pieces and the opening of the associated front bearing means of the rear one of the adjacent rail pieces, the other of the pivotal means being provided through the opening of the other rear bearing means of the front rail piece and the opening of the associated front bearing means of the rear rail piece, and each of the pivotal means being fixed into one of the associated openings, the foremost rail piece further including (vi) opposed side walls each provided with a rear bearing means having an opening, (vii) recesses provided in the respective side walls for receiving the respective front bearing means of a first intermediate rail piece such that the openings of the front bearing means of the first intermediate rail piece are aligned with the openings of the rear bearing means of the foremost rail piece, respectively, (viii) each of the opposed side walls of the foremost rail piece having a rear upper end face inclined forward from a top of one of the rear bearing means and a rear lower end face inclined forward from a bottom of said one of the rear bearing means, and (ix) the foremost rail piece being connected to the first intermediate rail piece by a pair of foremost pivotal means provided through the opening of one of the rear bearing means of the foremost rail piece and the opening of one of the front bearing means of the first intermediate rail piece and through the opening of the other rear bearing means of the foremost rail piece and the opening of the other front bearing means of the first intermediate rail piece, respectively, front end faces of the foremost rail piece being fixed to one of the nonflexible rails, so that the foremost pivotal means allow only the first intermediate rail piece to make pivotal pivotal movement, the rearmost rail piece further including (i) a pair of front laterally opposed bearing means with openings, (ii) each of the opposed side walls of the rearmost rail piece having a front upper end face inclined rearward from a top of one of the front bearing means and a front lower end face inclined rearward from a bottom of said one of the front bearing means, and (iii) the rearmost rail piece being connected to the last intermediate rail piece by a pair of rearmost pivotal means provided through the opening of one of the front bearing means of the rearmost rail piece and the opening of one of the rear bearing means of the last intermediate rail piece and through the opening of the other front bearing means of the rearmost rail piece and the opening of the other rear bearing means of the last intermediate rail piece, respectively, rear end faces of the rearmost rail piece being fixed to the other nonflexible rail, so that the rearmost pivotal means allow only the last intermediate rail piece to make pivotal movement, and each of the foremost and rearmost pivotal means being fixed into one of the associated openings.

* * * * *